US011710100B2

(12) United States Patent
Stracquatanio et al.

(10) Patent No.: US 11,710,100 B2
(45) Date of Patent: *Jul. 25, 2023

(54) METHOD FOR AUGMENTING PROCEDURES OF A LOCKED, REGULATED DOCUMENT

(71) Applicant: Apprentice FS, Inc., Port Jefferson Station, NY (US)

(72) Inventors: Angelo Stracquatanio, Port Jefferson Station, NY (US); Nabil Chehade, Port Jefferson Station, NY (US); Frank Maggiore, Port Jefferson Station, NY (US); Ali Jaafar, Port Jefferson Station, NY (US); Milan Bradonjic, Port Jefferson Station, NY (US); Kenny Chapman, Port Jefferson Station, NY (US); Tanya Maroz, Port Jefferson Station, NY (US); Sam Brewton, Port Jefferson Station, NY (US); Kingsley Adarkwah, Port Jefferson Station, NY (US)

(73) Assignee: Apprentice FS, Inc., Jersey City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,944

(22) Filed: Mar. 9, 2022

(65) Prior Publication Data

US 2022/0198359 A1 Jun. 23, 2022

Related U.S. Application Data

(63) Continuation of application No. 16/678,992, filed on Nov. 8, 2019, now Pat. No. 11,301,793.

(Continued)

(51) Int. Cl.
*G06Q 10/06* (2023.01)
*G06F 3/01* (2006.01)
(Continued)

(52) U.S. Cl.
CPC ............. *G06Q 10/10* (2013.01); *G06F 3/012* (2013.01); *G06Q 10/06316* (2013.01);
(Continued)

(58) Field of Classification Search
CPC .. G06Q 10/06316; G06Q 10/10; G06F 3/012; G06F 16/20; G06F 16/44; G06F 16/50;
(Continued)

(56) References Cited

U.S. PATENT DOCUMENTS 8,977,558 B2 * 3/2015 Nielsen ................ G06Q 10/103
705/7.42
9,530,050 B1 * 12/2016 Erol ....................... G06F 16/434
(Continued)

*Primary Examiner* — Abderrahim Merouan
(74) *Attorney, Agent, or Firm* — Run8 Patent Group, LLC; Peter Miller; Alexander Rodriguez

(57) ABSTRACT

A method for augmenting procedures at production equipment includes: linking a first description of a first step in a procedure and a capture type to a first capture field; generating a digital draft procedure comprising descriptions of steps extracted from the procedure and the first capture field specifying data capture of the first capture type from an equipment unit; generating augmented guidance for the first step in the procedure based on visual content recorded by a mobile device—assigned to an exemplary operator—during completion of the first step in the digital draft procedure; linking the augmented guidance to a location proximal the equipment unit based on locations of the first mobile device during completion of the first step in the digital draft procedure; and generating an augmented digital procedure based on steps in the procedure, the augmented guidance, and definitions for data capture according to the first capture field.

20 Claims, 6 Drawing Sheets

Related U.S. Application Data

(60) Provisional application No. 62/757,593, filed on Nov. 8, 2018.

(51) Int. Cl.
    *G06Q 10/10*     (2023.01)
    *G06Q 10/0631*     (2023.01)
    *G06T 11/00*     (2006.01)
    *G06V 20/20*     (2022.01)

(52) U.S. Cl.
    CPC .............. *G06T 11/00* (2013.01); *G06V 20/20* (2022.01); *G06T 2200/24* (2013.01)

(58) Field of Classification Search
    CPC ..... G06F 16/60; G06F 3/167; G06K 9/00442; G06K 9/00671; G06T 11/00; G06T 2200/24; G05B 19/0425; G05B 19/0426; H04N 21/23614; H04N 21/2365; H04W 4/029; H04W 4/70; G01C 21/206
    See application file for complete search history.

(56) References Cited

U.S. PATENT DOCUMENTS

| | | | |
|---|---|---|---|
| 11,145,130 B2 * | 10/2021 | Maggiore | H04W 4/029 |
| 2017/0177807 A1 * | 6/2017 | Fabian | G16H 40/20 |
| 2019/0316912 A1 * | 10/2019 | Maggiore | H04W 4/029 |
| 2020/0167712 A1 * | 5/2020 | Stracquatanio | G06Q 10/10 |

\* cited by examiner

METHOD FOR AUGMENTING PROCEDURES OF A LOCKED, REGULATED DOCUMENT

CROSS-REFERENCE TO RELATED APPLICATIONS

This application is a continuation of U.S. Non-Provisional application Ser. No. 16/678,992, filed on 8 Nov. 2019, which claims the benefit of U.S. Provisional Application No. 62/757,593, filed on 8 Nov. 2018, each of which is incorporated in its entirety by this reference.

TECHNICAL FIELD

This invention relates generally to the field of augmenting procedures within regulated industries where documents are controlled and locked to meet regulatory requirements.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
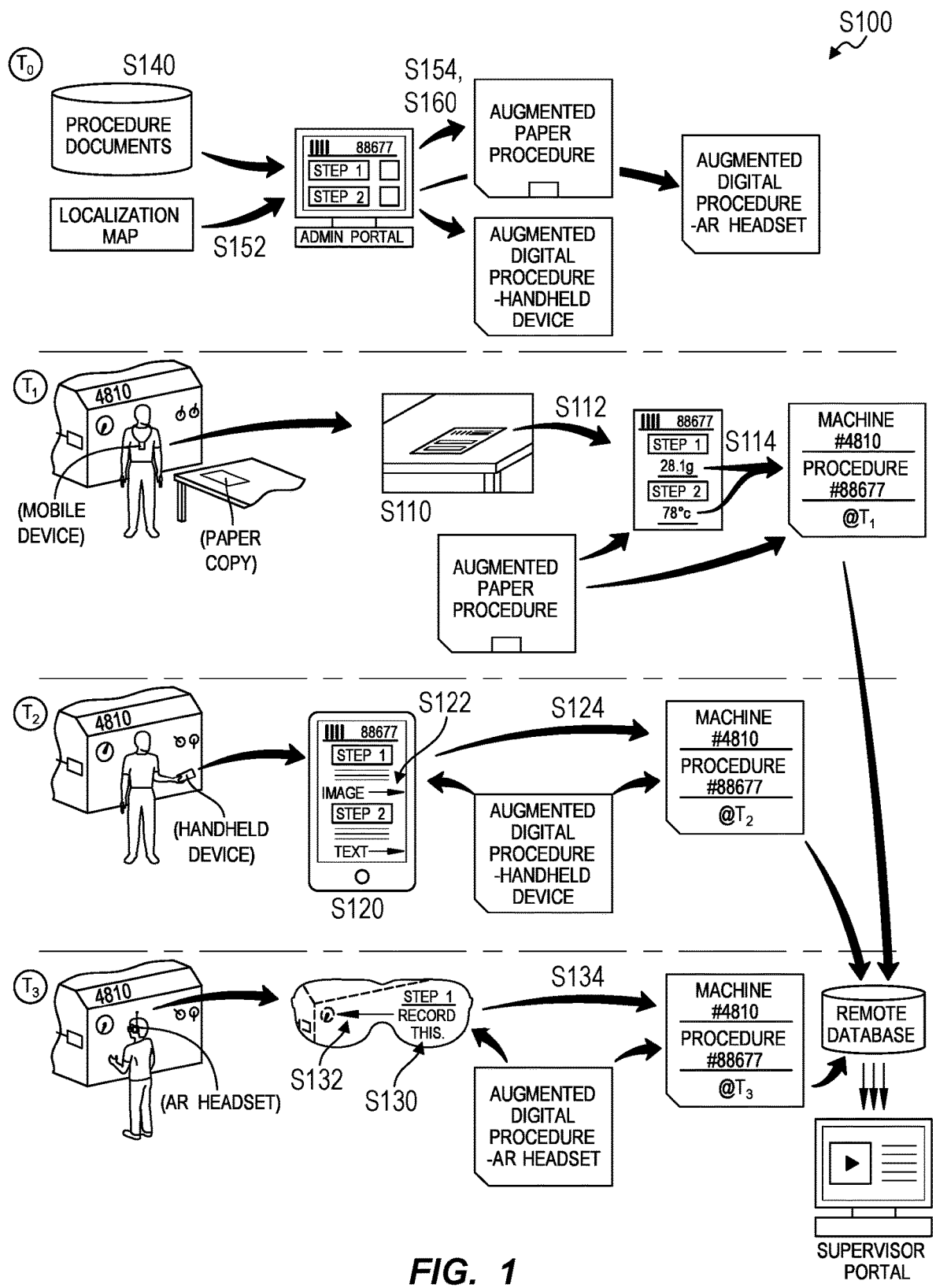
FIG. 1 is a flowchart representation of a method.

As shown in FIG. 1, a method S100 for augmenting procedures at production equipment includes: as a first operator completes a first instance of a paper copy of a procedure defining a set of steps at an equipment unit over a first period of time, recording a first set of images via a camera integrated into a first mobile device carried by the first operator in Block S110; extracting a first set of values, handwritten on the paper copy, from the first set of images in Block S112; and storing the first set of values, as results of a first instance of the procedure completed at the equipment unit, in a first procedure file in Block S114. The method S100 also includes: as a second operator completes a second instance of an augmented digital version of the procedure at the equipment unit with a handheld mobile device over a second period of time, rendering the set of steps on a display of the handheld mobile device in Block S120 and recording a second set of data manually entered into the handheld mobile device by the second operator responsive to the set of steps in Block S122; and storing the second set of data, as results of the second instance of the augmented digital version of the procedure completed at the equipment unit, in a second procedure file in Block S124. The method S100 further includes: as a third operator completes a third instance of the augmented digital version of the procedure at the equipment unit with an augmented reality headset worn by the third operator over a second period of time, rendering the set of steps in a virtual environment on a display in the augmented reality headset in Block S130 and recording a third set of data at the augmented reality headset according to the set of steps in Block S132; and storing the third set of data, as results of a third instance of the procedure completed at the equipment unit, in a third procedure file in Block S134.

2. Applications

Generally, the method S100 can be executed within a production facility to support completion of one procedure for one machine over a range of mobile devices hosting a range of augmented guidance and data collection for a variety of operators (hereinafter "operators") with different comfort levels and preferences for performing this procedure. In particular, Blocks of the method S100 can be executed by a set of a mobile devices in conjunction with a remote computer system: to passively collect procedure-related data and operator performance data, such as through a mobile and/or wearable device worn on the operator's, body, neck, or head (e.g., a smartphone or smartglasses) as a first operator performs a first instance of a procedure at a machine by reading and annotating a physical copy of a paper outlining steps of this procedure; to serve steps of the procedure through a handheld mobile device (e.g., a smartphone or tablet computer) carried by a second operator and to record procedure-related data and operator performance data through the handheld mobile device responsive to inputs by the second operator as the second operator performs a second instance of the procedure at the machine; and to serve steps of the procedure and augmented reality guidance through an augmented reality headset worn by a third operator and to record procedure-related data and operator performance data through the augmented reality headset as the third operator performs a third instance of the procedure at the machine.

Therefore, the method S100 can be executed within this facility to support different types of data collection and different degrees of automated procedural guidance for operators performing testing and operating procedures within the facility workspace. The method S100 can thus enable an operator to select a data collection method and a degree of automated procedural guidance that the operator is most comfortable with and to change her selection over time, such as while the operator becomes more comfortable with certain data collection and augmented reality technologies supported by various devices executing Blocks of the method S100.

The method S100 is described herein as executed within a pharmaceutical production facility to support a spectrum (or "matrix") of devices, data capture, data collection, and automated procedural guidance options for operators (e.g., operators, technicians) performing testing and operating procedures on biotechnical and/or pharmaceutical production equipment (hereinafter "machines" and "support equipment"). For example, the method S100 can support: 1) completion of a procedure on a physical paper copy of the procedure while a mobile device (e.g., augmented reality headset or a smartphone) worn by an operator passively records video of the procedure and provides no automated procedural guidance to the operator; 2) completion of the procedure on a physical paper copy of the procedure while a mobile device worn by an operator passively records video of the procedure and provides some automated procedural guidance to the operator; 3) completion of the procedure with step-by-step guidance and audio, visual, and/or text-input recordation by a mobile device (e.g., a smartphone, a tablet) carried by an operator as the mobile device passively records video of the procedure; 4) completion of the procedure with step-by-step augmented reality guidance and audio, visual, and/or text-input recordation by a mobile device (e.g., a smartphone, a tablet) carried by an operator as the mobile device passively records video of the procedure and automatically records target metrics specified by the procedure; and 5) completion of the procedure with step-by-step augmented reality guidance and audio, visual, and/or text-input recordation by augmented reality headset worn by an operator as the augmented reality headset (actively or passively) records video of the procedure and automatically records target metrics specified by the procedure.

The method S100 can therefore be implemented within a working space in a production facility in order to reduce friction during recordation of data from non-networked (or "siloed") machines and support equipment and for supporting operators interfacing with, managing, and operating these machines and support equipment through augmented reality. However, the method S100 can be implemented by a local device and/or a remote computer system to repackage augmented guidance for steps within procedures (or work instructions, workflows, methods, training, qualifications, verifications, observations, investigations, processes with an equipment unit)—into various formats. The method S100 can also be implemented by a local device and/or remote computer system to serve this content to operators—performing procedures, steps, or other processes in any other environment (e.g., lab testing facilities, hospitals, construction sites)—based on guidance preferences of these operators and limitations of their devices.

3. System

Generally, Blocks of the method S100 can be executed by a system including: a remote computer system, such as a remote server or a computer network; and a mobile device, such as including or connected to an augmented-reality headset. For example, the mobile device can be an augmented reality headset, including a heads-up display, eyes-up display, head-mounted display, or smart glasses configured to render augmented reality content for an operator wearing this a mobile device. Alternatively, the mobile device can include a Wi-Fi-enabled smartphone or tablet connected to a separate augmented reality device, such as: removably attachable to an operator's coveralls, clean room gowning, and/or personal protective equipment; carried in the operator's hand; or worn on a lanyard on the operator's neck.

Furthermore, the mobile device can include: a suite of sensors configured to collect information about the mobile device's environment; local memory (and/or connectively to cloud-based memory) configured to (temporarily) store a localization map of a room; and a controller configured to determine a location of the mobile device in real space, such as based on the localization map, a hierarchy of localization methods, and data collected by the suite of sensors. For example, the mobile device can include: a depth camera paired with a 2D color camera; and/or a stereoscopic color camera. Each of these optical sensors can output a video feed containing a sequence of digital photographic images (or "frames"), such as at a rate of 20 Hz, and the controller can compile concurrent frames output by these optical sensors into a 3D point cloud or other representation of surfaces or features in the field of view of the mobile device. Following receipt of a localization map of a room occupied by the mobile device and generation of a 3D point cloud (or other representation of surfaces or features in the field of view of the mobile device), the controller can implement point-to-plane fitting or other techniques to calculate a transform that maps the 3D point cloud onto the localization map in order to determine the position of the mobile device within the workspace area. The mobile device can additionally or alternatively include a motion sensor and/or a depth sensing device, and the mobile device can generate a map of the working space area and track its location and pose within this map based on features detected in photographic and/or depth feeds recorded by these devices. The mobile device can similarly track its location by comparing constellations of features detected in photographic and/or depth feeds recorded by these devices to a 3D map of the facility supplied by the remote computer system.

The mobile device can also: implement object detection and object recognition techniques to detect and identify equipment, materials, consumables, and or other components or objects within the workspace based on constellations of features detected in photographic and/or depth feeds recorded by these sensors; implement methods and techniques similar to those described above to localize these objects within the workspace; track the position of the mobile device relative to these objects; and detect interactions between the operator and these objects accordingly.

However, the mobile device can include any other type of sensor in any other quantity and can implement any other method or technique to calculate its pose within a room based on a localization map of the room and data recorded by these sensors.

Additionally or alternatively, the remote computer system can interface with a stationary monitoring device deployed on or near an equipment unit within a workspace and configured to record images, an audio feed, and/or a video feed of an operator (or a "user") performing procedures on or near this equipment unit. The remote computer system can then implement similar methods and techniques to: detect an operator and objects in these images, audio feed, and/or video feed; and detect and record interactions between the operator and these objects.

However, the remote computer system can include or interface with local and/or remote devices of any other type or configuration.

4. Augmented Paper Procedure

Blocks S110, S112, and S114 recite: as a first operator completes a paper copy of a procedure defining a set of steps at a machine over a first period of time, recording a first set of images via camera integrated into a first mobile device carried by the first operator; extracting a first set of values, handwritten on the paper copy, from the first set of images; and storing the first set of values as results of a first instance of the procedure completed at the machine. Generally, in Blocks S110, S112, and S114, a mobile device worn or carried by an operator (e.g., a smartphone or smartglasses) passively collects data while an operator employs a physical paper copy of a procedure when testing or operating a machine in the facility, and the mobile device then cooperates with the remote computer system to process and store these data.

4.1 Paper Augmentation

In one implementation shown in FIG. 1, an administrator affiliated with the facility loads an existing paper copy of a document outlining steps of a procedure for a machine in the facility into an administrator portal—hosted by the remote computer system—to create a digital form of this procedure. For example, the administrator can scan the paper copy of the document with a smartphone, tablet, or dedicated scanner; alternatively, the administrator can directly access a digital (e.g., vectorized, digitized) copy of this document.

The administrator portal can then interface with the administrator to: highlight a procedure identifier in a digital copy of the document, such as a QR code, barcode, alphanumeric procedure identifier and revision number, or textual description of the procedure; and link this procedure identifier to a particular machine, type or class of machine, or configuration of machine in the facility and/or to a particular location, room, or area inside the facility. For example, the administrator can select each machine, machine type or class, or machine configuration from a dropdown menu—rendered in the administrator portal—of all machines in the facility and/or select a machine or location within the facility from a map (e.g., a plan map, or a 3D localization map) of the facility—rendered in the administrator portal—to link to this procedure identifier. The administrator portal can similarly interface with the administrator to link support equipment, such as a scale, to this procedure identifier.

The administrator portal can further interface with the administrator to specify data input regions in this digital copy of the document. For example, the administrator can highlight input fields specifying manual recordkeeping in the digital copy, such as by highlighting a line or drawing a bounding box around a region in the digital copy of the document that specified recordation of a weight, pressure, temperature, density, or composition value read from a scale or dial on a machine or specifying recordation of a textual note. The administrator can then link each highlighted input field in the digital copy to a data type or data class, such as: a numerical input value; a text or alphanumeric input value; or an optional image, audio recording, or video recording (e.g., if an operator elects to interface with a mobile device during an instance of this procedure).

Once the digital copy of the document is thus linked to a procedure, work instruction, machine, and/or machine type, etc. and once input fields in the digital copy are identified on the digital copy and characterized, the administrator portal and/or the remote computer system can initialize a file format for storing data recorded manually on physical paper copies of the document by operators performing this procedure in the facility. For example, the remote computer system can: generate an image mask for each input field in the digital copy; and link each image mask to a cell, vector space, line, or other data container for a procedure file generated for one instance of this procedure completed at one machine in the facility. For example, a link between an image mask and a cell, vector space, line, or other data container can be defined manually by the administrator via the administrator portal. Alternatively, the remote computer system can implement machine learning to: analyze the document; automatically interpret placement of these input fields, icons, touch points, Tillable fields, and/or content links; and automatically generate these links.

4.2 Manual Procedure

An operator may later: retrieve a physical paper copy of this procedure document for a machine scheduled for testing or operation; approach this machine within the facility while wearing or carrying a mobile device (e.g., a smartphone hanging on a lanyard, a pair of smartglasses); and manually perform a sequence of steps outlined in this physical paper copy, such as including hand-writing values from displays, dials, or readouts, etc. on the machine and/or support equipment directly onto this paper copy of the procedure document, as shown in FIG. 1.

Subsequently, the remote computer system (or this mobile device) can access a video or a set of still images—of completed pages of the paper procedure—recorded by the operator via the mobile device, such as following completing of each individual page of the paper procedure or following completion of the entire procedure. The remote computer system (or this mobile device) can: select a frame from this video or a still image from this set of still images; detect a page of the physical paper copy in this frame, such as by detecting the procedure identifier and a page identifier in the frame; de-skew the frame and crop the frame around the detected page; project a first image mask associated with this page of the document onto the frame; implement optical character recognition techniques to extract a first numerical value or alphanumeric string from a remaining region of the frame exposed by the first image mask; store this first numerical value or alphanumeric string in a procedure file for this instance of the procedure; and repeat this process for each other image mask associated with this page of the document. The remote computer system (or the mobile device) can repeat this process to extract numerical values or alphanumeric strings from other frames depicting the same page and merge numerical values or alphanumeric strings to verify these extracted data.

The remote computer system (or the mobile device) can repeat this process for other pages of the procedure detected in frames in this video (e.g., asynchronously or in real-time as this video is recorded) in order to automatically populate a digital procedure file for this instance of the procedure—completed on a physical paper copy of a document outlining this procedure—with data collected during this instance of the procedure as specified by the procedure.

4.3 Mobile Device Localization

Figure 4:
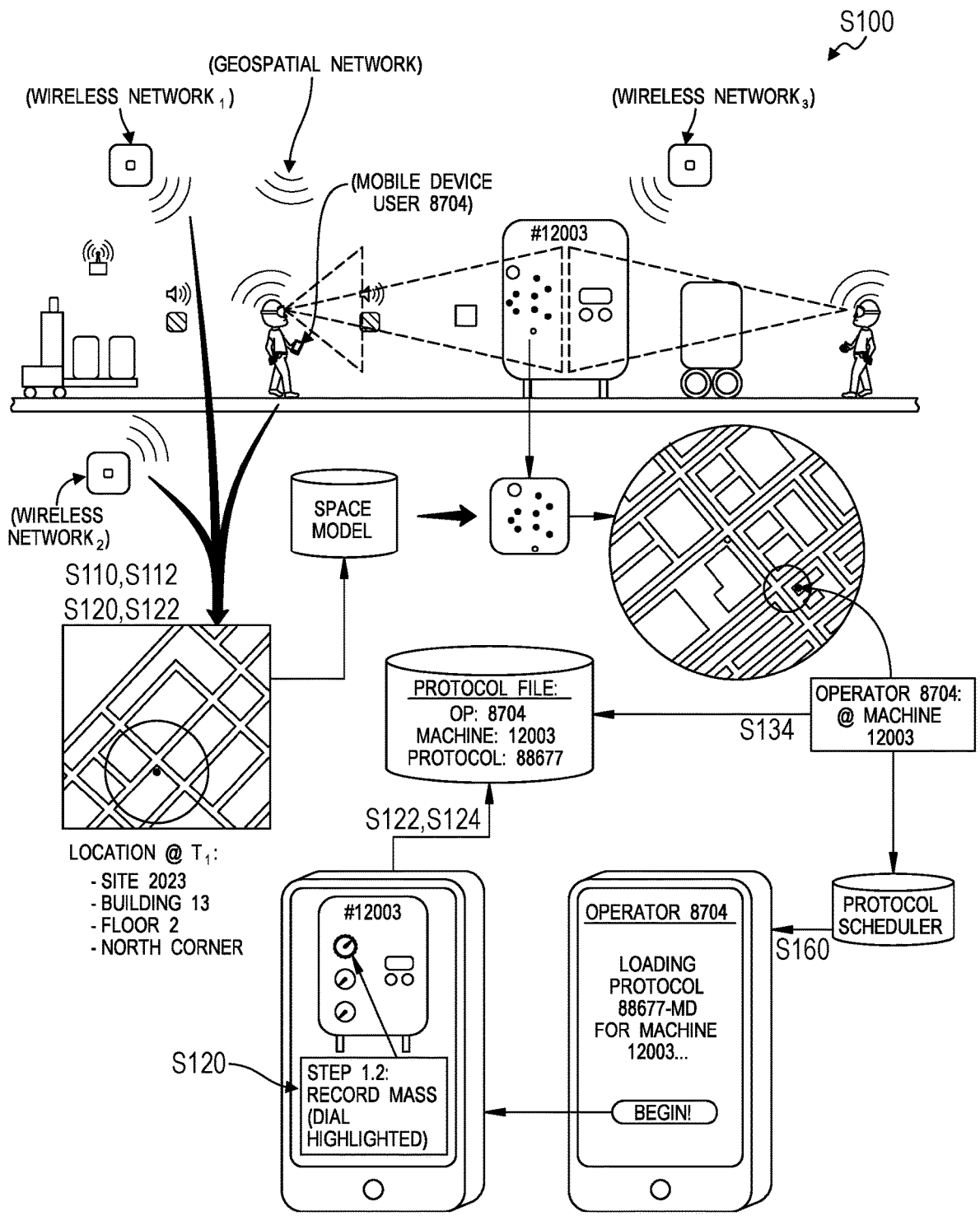
FIG. 4 is a flowchart representation of one variation of the method.

Furthermore, as the operator approaches the machine in preparation for performing this procedure, the mobile device—worn or carried by the operator—can track its location within the facility and identify a particular machine with which the operator is interfacing based on this location, such as shown in FIG. 4. For example, the mobile device can: determine that the mobile device is occupying a particular campus based on the mobile device's current geospatial (e.g., GPS) coordinates; determine the building, floor, and/or room that the mobile device is occupying based on wireless (e.g., Wi-Fi) connectivity in the workspace occupied by the mobile device; and then compare features detected in images recorded by a camera on the mobile device to a 2D or 3D localization map of the building, floor, and/or room in the facility in order to determine the position and orientation of the mobile device in real space. In this example, the mobile device (or the remote computer system) can then query a map of machines throughout the facility for a particular machine adjacent and facing the mobile device—and therefore the operator—based on the position and orientation of the mobile device in real space. Alternatively, the mobile device can identify the particular machine directly by matching a constellation of features detected in images recorded by the camera to a known, unique constellation of features associated with this particular machine.

The mobile device can regularly execute this process to monitor its position and orientation within the facility and detect machines nearby.

4.4 Passive Image Capture

The mobile device can also record still images or video while the operator performs steps of the procedure at the nearby machine.

In one example, the mobile device queries a procedure scheduler—such as stored in a remote database—for a set of procedures scheduled for completion at a set of machines in the facility at the current time, within a current time window (e.g., the current hour), within a current work shift (e.g., for 8 AM to noon on the current date), or on the current date. Responsive to determining that its current position falls within a threshold distance (e.g., two meters) of a particular machine in this set (and that its orientation is facing the particular machine), such as for a threshold duration of time (e.g., 15 seconds), the mobile device can determine that the operator intends to perform a scheduled procedure at the particular machine. Accordingly, the mobile device can automatically initiate image capture of the scene near the particular machine.

In a similar implementation, as the mobile device records images of its surrounding field and processes these images to determine its position and orientation in the facility, the mobile device can also scan these images for a procedure identifier, such as in the form of a black barcode, QR code, or alphanumeric string on a white background (e.g., printed on a white sheet of paper). Upon detecting a procedure identifier in the field near the mobile device, the mobile device can query a database (or the procedure scheduler) for locations, in the facility, of machines that are associated with the procedure identifier. Then, responsive to determining that its current position falls within the threshold distance of a particular machine in this set (and that its orientation is facing the particular machine), such as for the threshold duration of time, the mobile device can determine that the operator intends to perform the procedure associated with this procedure identifier at the particular machine. Accordingly, the mobile device can automatically initiate image capture of the scene near the particular machine, such as: by recording a continuous video while the mobile device remains near the machine; by opportunistically recording video snippets or still images when the camera on the mobile device is facing an object or surface of interest associated with the procedure (e.g., a work surface, an input control on an equipment unit, a readout or dial), as described below; by recording continuous video and storing or flagging only individual video frames in which an object or surface of interest associated with a current step in the procedure is detected or predicted to be present in the video frame based on the location and pose of the mobile device; and/or by recording continuous video and opportunistically storing or flagging individual video frames in which the procedure identifier of the document is detected.

In the foregoing implementations, the mobile device can continue to record video or still images until the mobile device determines that its position has moved substantially away from the particular machine, such as beyond a threshold distance (e.g., three meters) from the particular machine for more than a threshold duration of time (e.g., 30 second). (The mobile device can therefore implement hysteresis techniques to automatically disable image capture when the operator moves away from the particular machine.) Alternatively, the mobile device can set a timer for a common duration of the scheduled or identified procedure (e.g., 120% of the average duration of this procedure) and record images over this duration of time after determining that the operator—carrying the mobile device—is occupying a position near the particular machine with the intent of performing this procedure at the particular machine. Yet alternatively, the mobile device can cease image capture responsive to manual input—indicating completion of the procedure—from the operator.

Therefore, in the foregoing implementations, the mobile device can record a continuous video feed (e.g., at a frame rate of 24 Hz) during completion of this procedure—on paper—by the operator and upload this video feed to a remote database for real-time or asynchronous processing and review, such as: manually by a supervisor; manually by a second scientist; or automatically by the remote computer system. Alternatively, the mobile device can intermittently record still images, such as: when the mobile device is adjacent and oriented toward the machine or a page of the physical paper copy of the document (and substantially static); and/or when the mobile device occupies a position and orientation that locates an object of interest (e.g., a display or readout on the machine) in the field of view of the camera, such as described below.

4.5 Manual Capture

The mobile device can additionally or alternatively initiate image capture responsive to a manual input by the operator into the mobile device, such as when the operator is facing a display on the machine or holding a page of the physical paper copy of the procedure document in front of a camera in the mobile device.

4.6 Digital Recordation

In one variation shown in FIG. 1, as the operator manually completes a physical paper copy of this procedure document while wearing or carrying the mobile device, the mobile device can implement methods and techniques described above to: record a continuous video; scan each frame in this video for a page of this physical paper copy of this procedure document, such as for a black barcode, QR code, or alphanumeric string and a page number or page identifier located over a white background; and flag particular frames in which a page of the physical paper copy of this procedure document was detected. The mobile device (or the remote computer system) can then: scan this set of flagged frames for notes and values handwritten on pages depicted in these frames; implement optical character recognition techniques to detect and extract these notes and values in digital form from these frames, such as described above; and then write these values to the procedure file based on the file format defined for this procedure document. Therefore, the mobile device can opportunistically record video (or video snippets, or still images) as the operator performs the procedure manually on a physical paper copy of this procedure document; and the remote computer system (or the mobile device) can automatically extract handwritten values from this video and store these data in a digital procedure file.

Additionally or alternatively, the operator may hold the current page of the physical paper copy of this procedure document in front of the camera on the mobile device (or vice versa), such as when the operator completes each subsequent step of the procedure or completes all steps on this page. The operator may manually trigger the mobile device to record an image of the page, or the mobile device can implement the foregoing methods and techniques to automatically detect the page and then record a still image thereof. The remote computer system (or the mobile device) can then extract handwritten values from this video and store these data in a digital procedure file.

The mobile device (or the remote computer system) can also: detect a display, readout, or printout, etc. in a frame thus recorded by the mobile device during a step of the procedure; extract text or a numerical value from this frame;

and write these extracted values to the procedure file for this instance of the procedure, such as described below.

The remote computer system and the mobile device can execute the foregoing process in real-time during this procedure. The remote computer system (or the mobile device) can then serve video (or video snippets, still images) recorded by the mobile device during the procedure and data extracted from this video to a supervisor—such as in real-time during the procedure—to enable the supervisor to verify the procedure in real-time, even as the operator completes the procedure on physical paper. Alternatively, the remote computer system can serve video (or video snippets, still images) recorded by the mobile device during the procedure and data extracted from this video to the supervisor following conclusion of the procedure, thereby enabling the supervisor to review the operator's performance and results of the procedure post hoc despite the operator completing the procedure on physical paper.

4.7 Paper Document Revision

In one variation, the administrator performs the foregoing process to upload and annotate each subsequent revision of the document for this procedure. The administrator portal or the remote computer system can track the current revision of this document, such as including a time and a date on which the current revision was released, and link each revision to a unique procedure identifier or unique combination of procedure identifier and revision number. Thus, when a mobile device detects a procedure identifier or unique combination of procedure identifier and revision number on a physical paper copy of a procedure document, the mobile device can: verify that this procedure identifier or unique combination of procedure identifier and revision number corresponds to the current revision of the procedure; and then automatically render a visual prompt or serve an audible prompt to retrieve a paper copy of the current revision of this procedure if this procedure identifier or unique combination of procedure identifier and revision number corresponds to a previous revision of the procedure.

5. Digital Procedure on Handheld Device

Blocks S120, S122, and S124 recite: as a second operator completes an augmented digital procedure for the machine at a handheld mobile device over a second period of time, rendering the set of steps on a display of the handheld mobile device and recording a second set of data manually entered into the handheld mobile device by the second operator responsive to the set of steps; and storing the second set of data as results of a second instance of the procedure completed at the machine. Generally, in Blocks S120, S122, and S124, a mobile device carried by an operator (e.g., a smartphone or tablet) serves an instance of an augmented digital procedure to an operator and interfaces with the operator to record data specified by this procedure.

5.1. Digital Procedure Augmentation for Handheld Device

In this variation, the administrator portal can interface with the administrator to construct an augmented digital procedure based on the digital copy of the procedure document described above, as shown in FIGS. 2 and 3.

In one implementation shown in FIG. 1, once the digital copy of the document is thus linked to a particular machine or machine type, etc. and once input fields are identified in the digital copy, the administrator portal can interface with the administrator to associate these input fields with data capture triggers, such as: audio (e.g., "voice") capture; textual note capture (e.g., through a virtual keyboard); quantitative value capture (e.g., through a virtual keypad); and image capture (e.g., through a camera in the mobile device), each triggered manually by an operator interfacing with the mobile device during an instance of the procedure.

For example, the administrator portal can interface with the administrator to link procedural options to fields in the digital procedure, such as: guidance options (e.g., text, audio, images, videos, 3D models, animations, haptic feedback) for guiding the operator through a step of the procedure; capture options (e.g., voice capture, photo capture, video capture, barcode capture, computer vision captures) for recording data during a step of the procedure; logic options (e.g., links within the procedure, links to other procedures, links to supporting documents and content, checklists, options, timers, label printing, integrations with other databases and systems) for navigating to additional or external content during a step of the procedure; and/or templates (e.g., for different forms, logs, procedures, batch records) for completing steps or sub-steps of a procedure or process.

Figure 2:
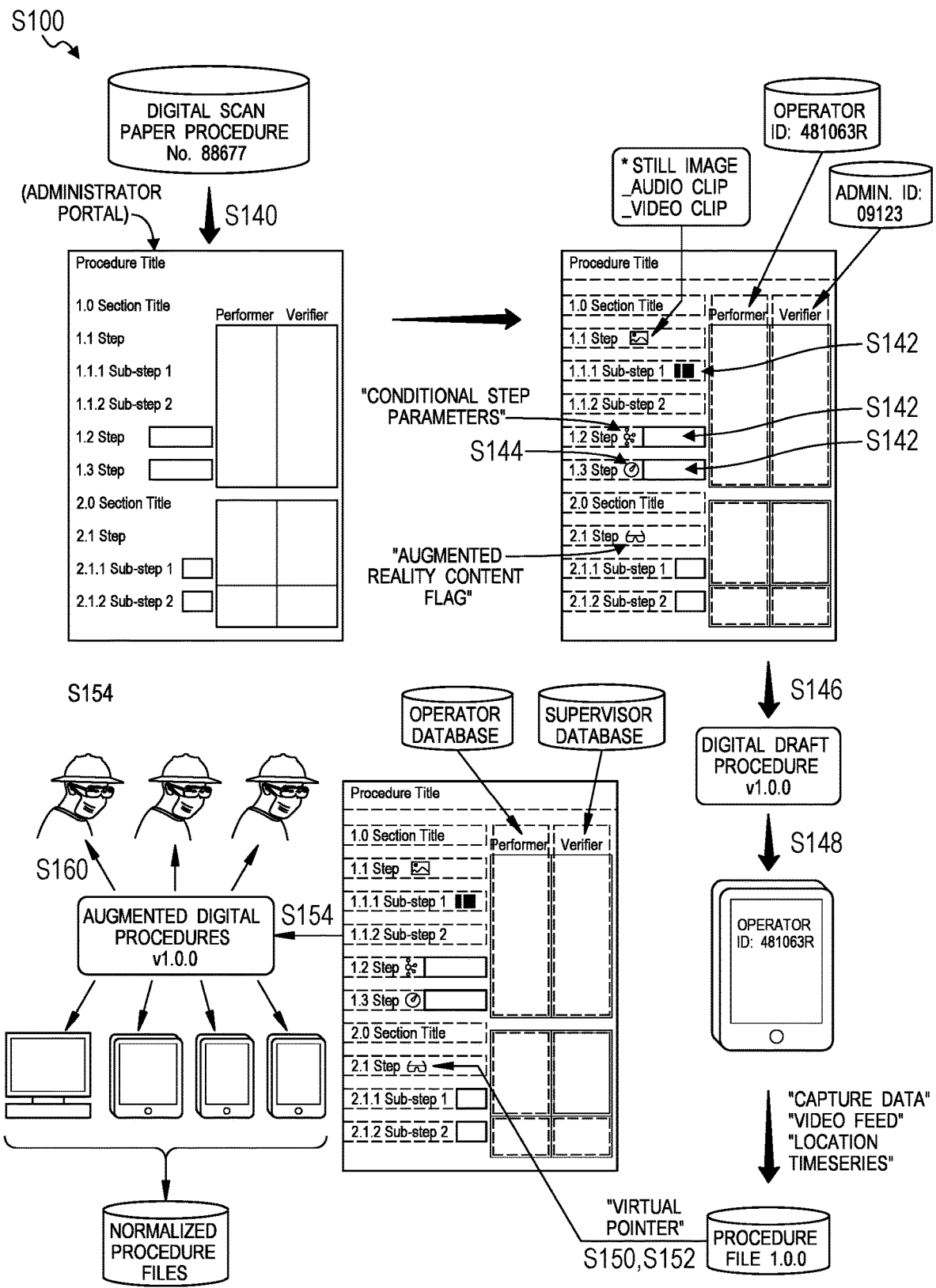
FIG. 2 is a flowchart representation of one variation of the method.
Figure 3:
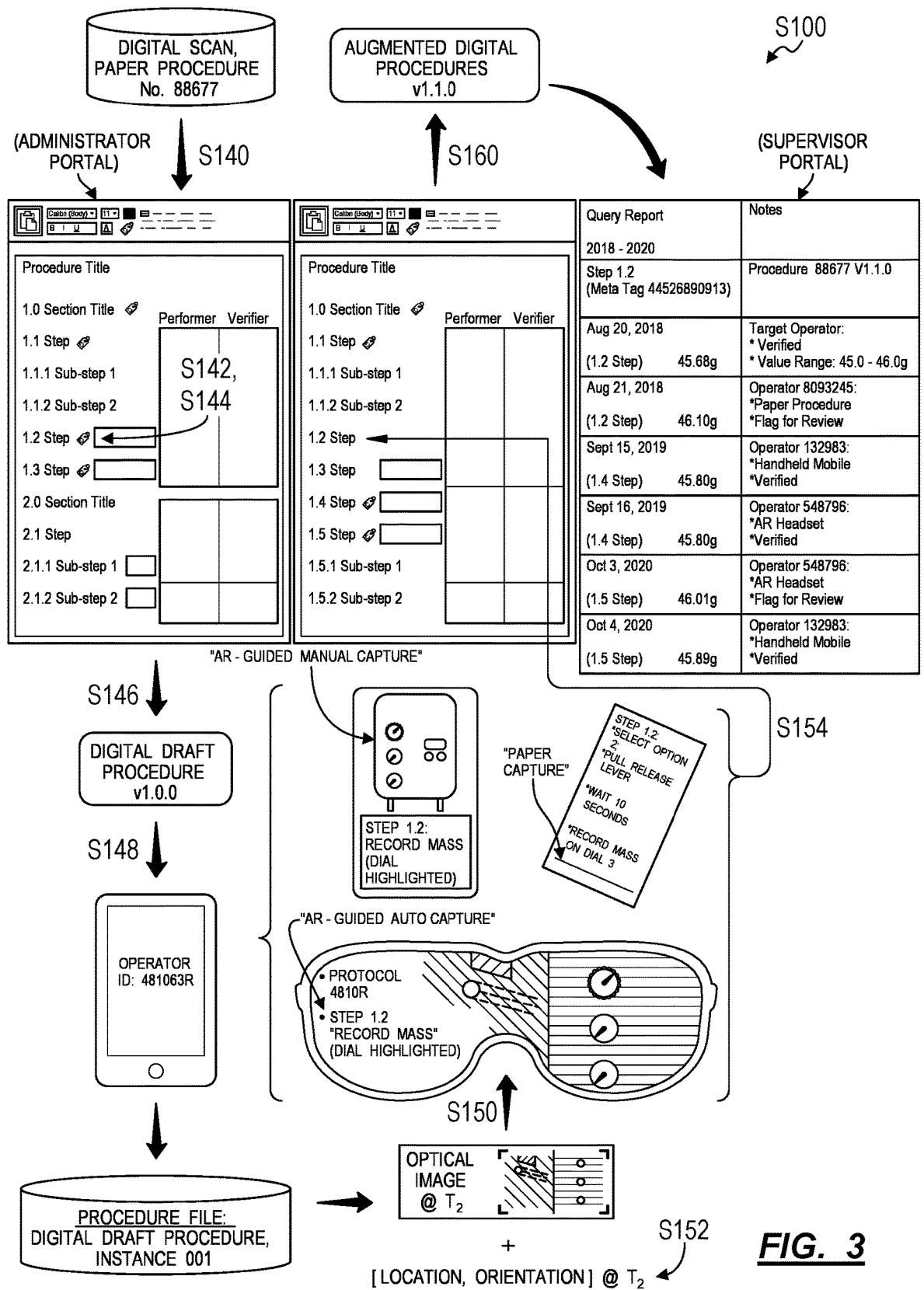
FIG. 3 is a flowchart representation of one variation of the method.

Once this augmented digital procedure is constructed at the administrator portal, the remote computer system can store this augmented procedure in a digital procedure database, as shown in FIGS. 2 and 3.

5.2 Auto-Loading Augmented Digital Procedure

In one implementation shown in FIG. 4, the mobile device implements methods and techniques described above to track its location and orientation within the facility. When the operator stops for more than a threshold duration of time (e.g., ten seconds) or when the mobile device determines that its location has moved less than a threshold distance within a period of time (e.g., one meter in ten seconds), the mobile device can: query the digital procedure database for an augmented digital procedure associated with a machine nearest the current position of the mobile device; and automatically load an instance of this augmented digital procedure for this machine, such as if this annotator portal is scheduled for completion within a current time window.

In a similar implementation, the mobile device can: rank machines in the facility by proximity to the current location of the mobile device; render a list of these machines ordered by their rank on a display of the mobile device; prompt the operator to select from the list; and download an instance of a particular augmented digital procedure associated with a machine selected by the operator.

Alternatively, the operator may select the particular machine directly from a dropdown list of machines or select the particular augmented digital procedure directly from a dropdown list of procedures. However, the mobile device can implement any other method or technique to select and load an instance of an augmented digital procedure.

5.3 Active Data Capture

Once the augmented digital procedure is loaded onto the mobile device, the mobile device can present content in this augmented digital procedure to the operator, as shown in FIG. 1. For example, the mobile device can: render each discrete page of the procedure document in sequential order; or consecutively render individual steps (or clusters of steps) outlined in the augmented digital procedure as the operator completes these steps over time.

As the operator performs a step of the augmented digital procedure rendered on the display of the mobile device, the operator may select a data input region adjacent this step in order to trigger active data capture by the mobile device. For example, when the operator selects an input region adjacent a step tagged for manual numerical input, the mobile device can: render a 10-digit keypad; record, geotag, and timestamp a numerical value entered by the operator into this input region via the keypad; and associate this numerical value with this step in this instance of the augmented digital procedure. In a similar example, when the operator selects an input region adjacent a step tagged for manual text string input, the mobile device can: render a keyboard; record, geotag, and timestamp a text string entered by the operator into this input region via the keyboard; and associate this text string with this step in this instance of the augmented digital procedure. When the operator selects a virtual "record" button over or adjacent a step tagged for voice capture, the mobile device can: record, geotag, and timestamp an audio file while the record button is depressed or between two consecutive selections of the virtual record button; and associate this audio file with this step in this instance of the augmented digital procedure. Furthermore, when the operator selects a virtual "record" button over or adjacent a step tagged for image capture, the mobile device can: record, geotag, and timestamp a still image (or a video, such as while the record button is depressed); and associate this still image (or this video) with this step in this instance of the augmented digital procedure.

5.4 Passive Data Capture

Like the variation described above, the mobile device can also passively record a continuous video feed, intermittent video snippets, or intermittent still images while the operator completes this instance of the augmented digital procedure. The mobile device computer network can also tag, filter, or prioritize frames in the video or still images in this set based on data capture triggered by the operator. For example, the mobile device can flag video frames or still images recorded over a period of time preceding initial manual entry of a numerical value or text string, such as from 30 seconds before to five seconds after this value or string was entered by the operator at the mobile device. In another example, the mobile device can flag video frames or still images recorded concurrently with an audio file following a manual input by the operator to initiate voice capture at the mobile device. In yet another example, the mobile device can flag video frames or still images recorded over a period of five seconds before and up to five seconds after an image capture was triggered by the operator.

The mobile device (or the remote computer system) can then prioritize these flagged video frames, video snippets, or still images for remote review by a second scientist or supervisor, as described below. For example, the mobile device can upload all passive and active data recorded during completion of the augmented digital procedure to a remote database. In this example, the remote computer system can then: selectively flag video snippets or particular still images from this corpus of passive data based on temporal alignment or temporal proximity to active data recorded by the operator; and then serve these flagged video snippets or still images to a second scientist or a supervisor to provide additional context when reviewing and verifying active data entered by the operator.

Alternatively, the mobile device can execute this process locally to selectively flag video snippets or particular still images recorded approximately concurrently with active data recorded by the operator; and then upload these flagged video snippets or still images to the remote database for subsequent distribution to a second scientist or to a supervisor for review and verification of data captured by the operator.

Additionally or alternatively, the mobile device (or the remote computer system) can implement similar methods and techniques to prioritize or filter passive data recorded by the mobile device during the instance of the augmented digital procedure based on geospatial proximity of the mobile device—when these passive data were recorded—to geotagged displays, dials, or readouts, etc. on the mobile ad or support equipment and associated with input regions in the augmented digital procedure.

6. Digital Procedure on Augmented Reality Headset

Blocks S130, S132, and S134 recite: as a third operator completes the augmented digital procedure for the machine at an augmented reality headset over a third period of time, rendering the set of steps on a heads-up display in the augmented reality headset and recording a third set of data at the augmented reality headset responsive to manual inputs by the third operator; and storing the third set of data as results of a third instance of the procedure completed at the machine. Generally, in Blocks S130, S132, and S134, an augmented reality headset worn by an operator serves an instance of an augmented digital procedure to an operator in the form of augmented reality content and interfaces with the operator to record data specified by this procedure.

6.1 Digital Procedure Augmentation for Augmented Reality Headset

In this variation, the administrator portal can interface with the administrator to further enhance the augmented digital procedure with augmented reality content, as shown in FIGS. 2 and 3. In one implementation, when configuring the augmented digital procedure, the administrator can access a localization map of the facility (as described above), such as including representations of: machines and equipment deployed throughout the facility; analog or digital controls on these machines and equipment; and locations of displays, dials, and/or readouts, etc. on these machines and equipment. The administrator can then: link the augmented digital procedure to a particular machine in the localization map; select a step of the augmented digital procedure specifying a input control into the machine; and link this step to a corresponding control—on the machine—represented in the localization map. Similarly, the administrator may: select a step of the augmented digital procedure specifying data capture; and link this step to a corresponding display, dial, or readout—on the machine—represented in the localization map. Furthermore, the administrator may: select a step of the augmented digital procedure specifying interaction with support equipment (e.g., a scale); and link this step to a nearest location in the facility in which such support equipment is stored according to the localization map and/or link this step to an existing 3D model of this support equipment.

6.2 Auto-Loading Augmented Digital Procedure and Guidance

Figure 5:
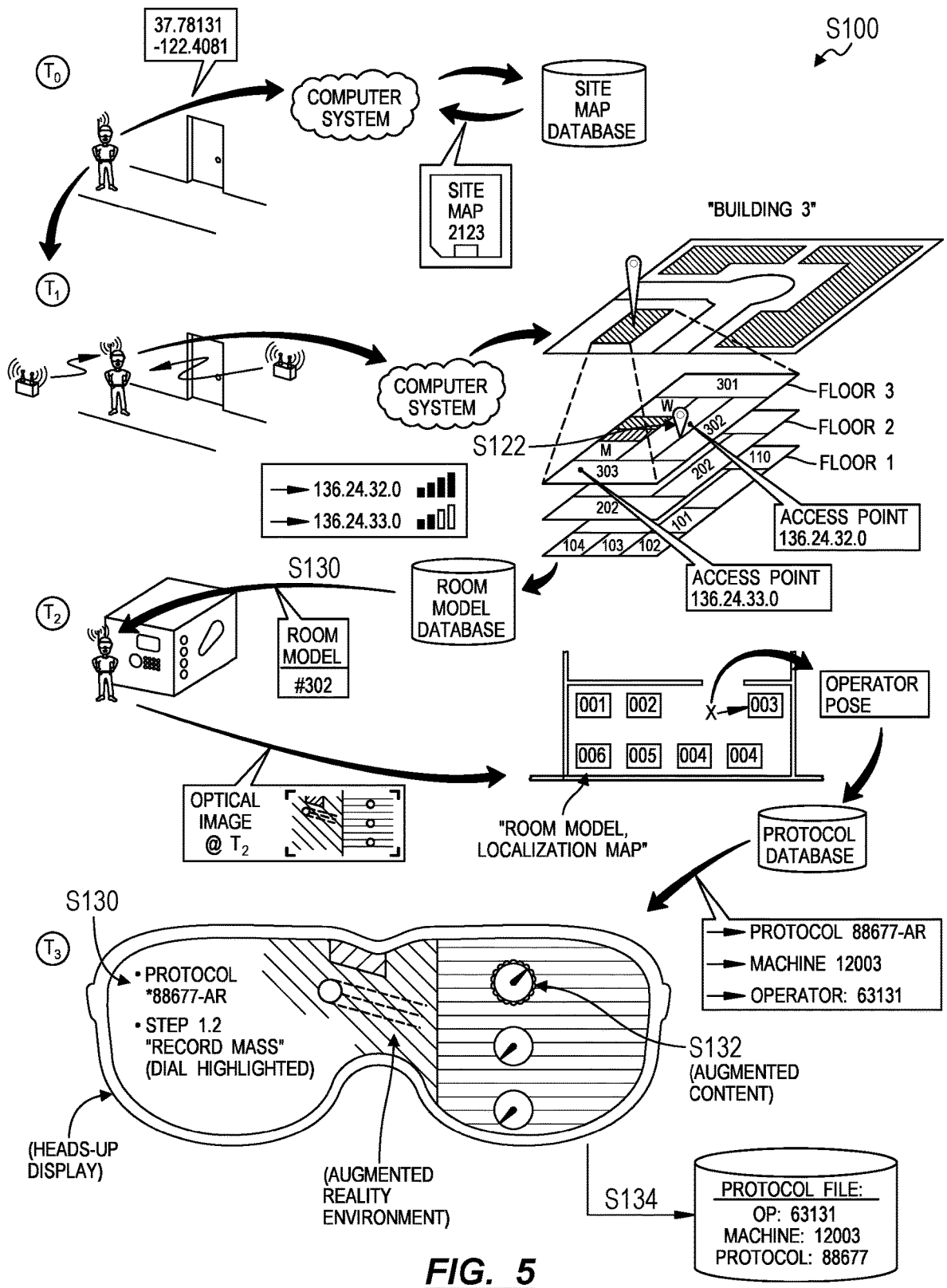
FIG. 5 is a flowchart representation of one variation of the method.

Subsequently, as an operator wearing this a mobile device moves through the facility and stops at a particular machine, the mobile device can: track its position and orientation within the facility; identify an augmented digital procedure relevant to this particular machine; and automatically load an instance of this augmented digital procedure, as shown in FIG. 5.

As shown in FIG. 1, as the operator opens a next step—in the augmented digital procedure—specifying a input control and linked to a particular location in the facility or to a particular feature on the machine, the mobile device can: calculate the global position of the control relative to the mobile device; calculate a local position of the control within the field of view of the heads-up display; render a static pointer, animation, or other indicator in this local position on the heads-up display; render a textual description of this step (e.g., an instruction to interface with this control) on a heads-up display; render a link (e.g., a line) from the textual description to the indicator on the heads up display, thereby prompting the operator to interface with this control to complete this step; and repeat this process to refresh the position of the indicator rendered on the heads-up display as the operator moves near the machine. The mobile device can also record video as the operator performs this step and store this video with a procedure file for this instance of the augmented digital procedure, as described below.

Similarly, as the operator opens a step—in the augmented digital procedure—specifying data capture and linked to a particular display on the machine, the mobile device can: calculate the global position of the display relative to the mobile device; calculate a local position of the display within the field of view of the heads-up display; render a static pointer, animation, or other indicator in this local position on the heads-up display; render a textual description of this step (e.g., an instruction to record a value from the display) on the heads-up display; render a link (e.g., a line) from the textual description to the indicator on the heads up display, thereby prompting the operator to interface with this display to complete this step; and repeat this process to refresh the position of the indicator rendered on the heads-up display as the operator moves near the machine, as shown in FIG. 5. The mobile device can then: implement speech-to-text techniques to transform the operator's speech during this step into an entry value for this step; record an alphanumeric value or text string entered manually by the operator through a peripheral device (e.g., a connected keyboard or smartphone); and/or record an image via the camera in the mobile device, such as if the mobile device is sufficiently static, the location of the dial is predicted to fall in the field of view of the camera, and the mobile device is within a maximum distance of the dial.

Furthermore, as the operator opens a step—in the augmented digital procedure—specifying interaction with support equipment linked to a 3D equipment model the mobile device can: scan images recorded by the camera for a constellation of features similar to the 3D equipment model; and render a textual description of this step (e.g., an instruction to interface with a unit of the support equipment to achieve a particular result) on the heads-up display in the mobile device. Once the mobile device detects a unit of the support equipment in the field of view of the camera, the mobile device can: calculate a local position of the support equipment intersecting the heads-up display in the operator's field of view based on a known offset between the camera and the heads-up display; render a static pointer, animation, or other indicator in this local position on the heads-up display; render a link (e.g., a line) from the textual description for the step to this indicator, thereby prompting the operator to interface with this control to complete an action described in this step; and repeat this process to refresh the position of the indicator rendered on the heads-up display as the operator moves around the support equipment. The mobile device can also record video as the operator performs this step and then store this video with the procedure file for this instance of the augmented digital procedure, as described below.

In the foregoing implementation, the administrator can alternatively link steps in the augmented digital procedure to a make, model, class, or configuration of a machine rather than to locations within a global coordinate system in the facility; and the mobile device can thus implement the foregoing methods and techniques to render augmented reality guidance for the operator completing instances of the augmented digital procedure at any number of machines of this make, model, class, or configuration in the facility.

(A handheld mobile device carried by the operator may implement similar methods and techniques to render augmented reality content—from this augmented digital procedure—on a display of the mobile device as the operator moves the mobile device through space during completion of an instance of this augmented digital procedure.)

7. Step Lockout

In the foregoing implementations, during a current step of a digital procedure, the mobile device can also verify locations and relative positions of equipment and a setup (e.g., a setup of a vessel or container at a workbench) detected in a still image or video feed recorded by the mobile device and then selectively activate a next step or a cascade of steps in the digital procedure for the operator (and/or for other operators working with the operator to complete the digital procedure) responsive to verifying these equipment and this setup specified in the current step of digital procedure.

8. Material Lockout

Furthermore, in the foregoing implementations, the remote computer system can automatically lock other operators out of performing this digital procedure at this machine when the operator elects or confirms this procedure at this machine. For example, the remote computer system can populate augmented reality environments rendered on augmented reality headsets worn by other operators and/or on mobile devices carried by other operators to indicate that equipment, raw materials, consumables, and/or other materials reserved for this procedure and this machine are reserved for the operator and therefore not accessible to these other operators.

9. Opportunistic Data Capture

In the foregoing variations, the augmented digital procedure can contain triggers for automatic background image capture by a mobile device; and a mobile device executing an instance of the mobile device can automatically record video snippets or still images based on its position and orientation in real space in order to augment data recorded manually by an operator with supporting visual documentation of a machine, support equipment, and scene around the machine during this procedure. In particular, the augmented digital procedure can be configured to trigger the mobile device to record still images or video snippets when the mobile device falls within position and orientation windows that locate displays, dials, or readouts, etc. of interest on a corresponding machine or support equipment in the field of view of a camera in the mobile device. In this variation, because the mobile device is relatively small and/or relatively more mobile, an operator carrying the mobile device can be more likely to move the mobile device through paths that locate displays, equipment, etc.—pertinent to the augmented digital procedure—within the field of view of the camera while the operator performs the augmented digital procedure.

In a similar example, as an operator—wearing an augmented reality headset—performs a step of an instance of the augmented digital procedure, the augmented reality headset can: detect a readout on the equipment unit in a video frame recorded by a camera integrated into the augmented reality headset; extract a value from this video frame; and write this value and/or this video frame to a procedure file for this instance of the augmented digital procedure.

Therefore, in this variation, the augmented digital procedure can be configured to opportunistically record video snippets or still images of objects and displays of interest for the augmented digital procedure when the mobile device moves into position and orientation windows associated with these objects and displays of interest during completion of the augmented digital procedure.

9.1 Digital Procedure Augmentation

In one implementation, when configuring the augmented digital procedure as described above, the administrator can access a localization map of the facility (as described above), such as including representations of machines and equipment deployed throughout the facility and locations of displays, dials, and/or readouts, etc. on these machines and equipment. The administrator can then: link the augmented digital procedure to a particular machine in the localization map; tag specific displays, dials, and/or readouts on this machine and support equipment nearby represented in this localization map as objects of interest; and link these objects of interest to particular steps outlined within the augmented digital procedure. When an operator carrying a mobile device approaches this particular machine and initiates an instance of this augmented digital procedure, the mobile device can: track its position and orientation in the facility, as described above; project its current position and orientation onto the localization map to predict objects that can fall in the field of view of a camera in the mobile device based on known intrinsic and extrinsic properties of the camera; and then opportunistically record video snippets and/or still images when this predicted field of view of the camera intersects a location of a display, dial, and/or readout associated with a step in augmented digital procedure currently open at the mobile device.

In a similar implementation, when configuring the augmented digital procedure, the administrator can: associate the augmented digital procedure with a particular make, model, and/or class of a machine; access a representative 3D model of this machine, including representations of displays, dials, and/or readouts, etc. on this machine; tag select displays, dials, and/or readouts, etc. in this 3D model as objects of interest for this augmented digital procedure; and link these objects of interest to particular steps outlined within the augmented digital procedure. Accordingly, when an operator carrying a mobile device approaches this particular machine and initiates an instance of this augmented digital procedure, the mobile device can: track its position and orientation relative to the machine, as described above; project its current position and orientation onto the model of the machine to predict displays, dials, and/or readouts, etc. on this machine that can fall in the field of view of a camera in the mobile device based on known intrinsic and extrinsic properties of the camera; and then opportunistically record a video snippet and/or still image when the predicted field of view of the camera intersects a known location of a display, dial, and/or readout tagged for opportunistic data—collection by the administrator—during the current step of the augmented digital procedure.

9.2 Data Packaging

As an operator carrying this mobile device moves through the facility and stops at a particular machine, the mobile device can: track its position and orientation within the facility; identify an augmented digital procedure relevant to this particular machine; automatically load an instance of this augmented digital procedure; host manual data capture by the operator according to steps outlined in this augmented digital procedure; and write these data to a procedure file for this instance of the augmented digital procedure, as described above, as shown in FIGS. 1 and 2.

Furthermore, while this instance of the augmented digital procedure is open on the mobile device, the mobile device can track its position and orientation in real space and opportunistically record video snippets and/or still images, as described above. During or upon conclusion of this instance of the augmented digital procedure, the mobile device (or the remote computer system) can then: isolate frames within this set of video snippets or still images that exhibit minimal blur; filter these remaining frames to include no more than one frame per time duration (e.g., one frame per 30-second interval); and then store this final set of frames—such as in the form of an image file or video file—which can be highly-representative of this instance of the augmented digital procedure but be of minimal file size.

Alternatively, the mobile device can: passively record a continuous video during completion of this instance of the augmented digital procedure by the operator; flag video frames—in this video—that were recorded while the mobile device occupied a position and orientation predicted to locate a display, readout, or other object of interest in the field of view of the camera (and recorded while the mobile device was substantially static or exhibiting limited motion); flag frames—in this video—recorded during data capture triggered by the operator; and upload this tagged video and related procedure file to a remote database. When a supervisor later reviews this procedure through a supervisor portal, as described below, the supervisor portal can render a timeseries of frames in this video with flags over these frames of interest, which can contain a high density of visual information pertinent to this instance of the augmented digital procedure. The supervisor can therefore review data contained in the procedure file and these frames of interest in the video—rather than the entirety of the video—to confirm and verify this instance of the augmented digital procedure, which can increase the supervisor's efficiency without substantively reducing the supervisor's effectiveness in detecting procedural errors in this instance of the augmented digital procedure.

9.3 Opportunistic Data Capture for Augmented Paper Procedure

In the variation described above in which the administrator constructs an augmented paper procedure, the administrator can implement methods and techniques similar to those described above to specify objects of interest in a field around a machine associated with this augmented digital procedure. When an operator manually completes a physical paper copy of this procedure document while wearing or carrying a mobile device, the mobile device can implement methods and techniques described above: to opportunistically record video snippets and/or still images when the predicted field of view of the camera in the mobile device intersects an object of interest specified in the procedure document; or to record a continuous video stream and to flag frames recorded at times that the predicted field of view of the camera in the mobile device intersects an object of interest specified in the procedure document.

The mobile device (or the remote computer system) can then store these data in a procedure file and package these data for review by a supervisor, as described below.

10. Procedure Verification

In one variation shown in FIGS. 1 and 3, the remote computer system interfaces with a supervisor via a supervisor portal to review the operator's process and to verify data collected during completion of an instance of a procedure. For example, the supervisor can occupy a control room in the same facility or be remote from the facility.

In one implementation in which an operator completes an instance of a procedure with a paper copy of the procedure document, a mobile device worn or carried by the operator may passively record and continuously stream video to the supervisor portal for remote, real-time supervision of the operator and/or remote verification of operator-recorded data by a supervisor. For example, the mobile device can selectively stream video (or serve still images) to the supervisor portal when the mobile device is spatially proximal a display, dial, or readout, etc. on a particular machine or support equipment associated with the augmented paper procedure currently performed by the operator. In particular, in this example, the mobile device can selectively stream video to the supervisor portal when the position and orientation of the mobile device falls within predefined position and orientation windows that locate these displays, dials, or readouts in the field of view of a camera integrated into the mobile device.

In another implementation, in which the operator completes an instance of the augmented digital procedure via handheld mobile device or augmented reality headset, the mobile device can track the current step in this augmented digital procedure. When the operator enters a next step—flagged for supervision or verification in the augmented digital procedure—at the mobile device, the mobile device can automatically stream video (or still images) passively recorded by the mobile device to a supervisor's second device substantially in real-time. The supervisor portal can then render this video feed substantially in real-time; a supervisor viewing this video stream at the second device can thus supervise the operator's process while performing this step or verify that the operator accurately recorded the correct data. The supervisor portal can also record a note or verification (e.g., "signoff") entered by the supervisor, such as by writing this note or verification for this particular step to a procedure file specific to this instance of the augmented digital procedure.

Furthermore, the supervisor portal can interface with the operator's a mobile device to gate (i.e., withhold) a next step of the augmented digital procedure until the supervisor confirms the current step at the supervisor portal. In particular, as the operator performs a particular step flagged for supervision or verification in the augmented digital procedure, the mobile device can: stream real-time video (or serve representative still images) to the supervisor portal; and then close this current step and unlock a next step in the augmented digital procedure only after the supervisor confirms or verifies the current step.

11. Digital Draft Procedure+Digital Procedure Publication

One variation of the method S100 shown in FIGS. 2 and 3 includes: accessing a document specifying a set of steps of a procedure for an equipment type in a facility in Block S140; linking a first description of a first step in the procedure, extracted from the document, to a first capture field in Block S142; assigning a first capture type to the first capture field in Block S144; generating a digital draft procedure comprising a set of descriptions of the set of steps extracted from the procedure and the first capture field specifying capture of data of the first capture type from the equipment type in Block S146; at a first time, serving the digital draft procedure to a first mobile device, assigned to a first operator, for completion at an equipment unit of the equipment type in the facility in Block S148; generating a first augmented guidance for the first step in the procedure based on visual content recorded by the first mobile device during completion of the first step in the digital draft procedure in Block S150; linking the first augmented guidance to a first location proximal the equipment unit based on a first pose of the first mobile device during completion of the first step in the digital draft procedure in Block S152; generating an augmented digital procedure comprising the set of descriptions of the set of steps, comprising the first augmented guidance linked to the first location, and specifying capture of data of the first capture type from the equipment type and linked to the first capture field in Block S154; and, following the first time, serving instances of the augmented digital procedure to augmented reality devices assigned to a second set of operators in the facility in Block S160.

11.1 Applications

Generally, in this variation, the remote computer system can execute Blocks in this variation of the method S100 to interface with an administrator (or supervisor, etc.) and an operator (or a "operator," a technician") to transform an "unenhanced" paper procedure—such as in the form of a paper or electronic copy—into a set of augmented procedures configured to support varying degrees of guidance and active or passive data capture based on support devices carried by other operators working in the facility. (Similarly the remote computer system can execute Blocks in this variation of the method S100 to generate one augmented procedure containing multiple augmentation layers supporting different degrees of guidance and data capture based on support devices carried by these operators.)

In particular, the remote computer system can: ingest a paper procedure uploaded or selected by the administrator at the administrator portal; detect, distinguish, and extract text blocks and related content outlining individual steps in the paper procedure; and to interface with the administrator via the administrator portal to link input fields specifying manual or automated data capture to steps detected in the paper procedure, such as described above. The remote computer system can then: aggregate text blocks and related content for each step and input fields for select steps in this paper procedure into a digital draft procedure executable on an augmented reality headset and/or handheld mobile device; interface with the administrator to link this digital draft procedure to a particular equipment unit or equipment type in the facility; and then schedule a target operator (e.g., a senior target operator, a target operator with significant experience performing this paper procedure and/or working with this particular equipment unit or equipment type) to perform a first instance of this digital draft procedure while wearing an augmented reality headset or carrying a mobile device.

This target operator may then perform this digital draft procedure at the particular equipment unit or at an equipment unit of this equipment type. Throughout this first instance of the digital draft procedure, the augmented reality headset worn by the target operator (or the mobile device carried by the target operator) can implement methods and techniques described above to: track and record a timeseries of its absolute position and orientation in the facility; track and record a timeseries of its position and orientation relative to the equipment unit (or a dial, readout, or input control, etc. on the equipment unit); capture a continuous video or the first instance of the procedure; and/or capture video snippets or still images of individual steps of the digital draft procedure. The augmented reality headset worn by the target operator (or the mobile device carried by the target operator) can also interface with the target operator: to record target operator notes within individual steps of the procedure; to locate augmented reality content—for individual steps in the procedure—placed by the target operator within an augmented reality environment rendered by the augmented reality headset (or mobile device) relative to the equipment unit or other features in the field (e.g., a pointer to a particular input control on the equipment unit for an input step of the procedure; a pointer to a readout on the equipment unit for a data capture step of the procedure); to record video snippets or still images triggered by the target operator during individual steps; and/or to extract values (e.g., numerical values, text strings) from these video snippets or still images and to link these extracted data—such as temporally and spatially—to their corresponding steps in the digital draft procedure and to corresponding regions on the equipment unit or in the nearby field. Thus, the augmented reality headset (or the mobile device) can passively capture location and visual content and interface with the target operator to actively capture visual content, extracted data from this visual content, and/or place augmented content in an augmented reality environment relative to the equipment unit or nearby features during this first instance of the digital draft procedure.

The remote computer system can then execute Blocks of this variation of the method S100: to access these temporal, spatial, visual, and virtual data captured by the augmented reality headset (or the mobile device) during the first instance of the digital draft procedure; and to interface with the administrator—via the administrator portal—to combine these data with the digital draft procedure to generate augmented digital procedures—in various formats and with various levels of augmented guidance and data capture—configured for execution on other augmented reality headsets and mobile devices worn or carried by other (less experienced) operators interfacing with the equipment unit or other equipment units of this equipment type in the facility.

For example, the remote computer system can interface with the administrator to compile these data into a first augmented digital procedure: configured for execution on an augmented reality headset; configured to render text and related context—extracted from the original paper procedure—in an augmented environment; configured to render virtual pointers—defined by the target operator and/or by the administrator and aligned to displays or input controls on the equipment unit—in the augmented environment; configured to retrieve and replay audio and/or video content recorded during steps the first instance of the digital draft procedure (i.e., to illustrate performance of the step by the target operator) when requested by an operator; configured to automatically capture video snippets and/or still images during the procedure based on locations and orientations of the augmented reality headset and steps of the procedure; configured to extract data from these video snippets and/or still images, and to record these data to input fields linked to steps in the procedure; and configured to compile these data into a procedure file for an instance of the augmented digital procedure. The remote computer system can similarly interface with the administrator to compile these data into a second augmented digital procedure: configured for execution on a handheld mobile device; configured to render similar augmented reality content; configured to retrieve and replay audio and/or video content recorded during steps of the first instance of the digital draft procedure when requested by an operator; configured to actively and passively capture video snippets and/or still images; configured to record data—extracted from these video snippets and/or still images—to input fields linked to steps in the procedure; and configured to compile these data into a procedure file for an instance of the augmented digital procedure. The remote computer system can interface with the administrator to compile these data into a third augmented paper procedure: configured for execution on handheld mobile device (e.g., work on a lanyard or suspended from a belt loop); paired with a paper copy of the procedure; configured to retrieve and replay audio and/or video content recorded during steps the first instance of the digital draft procedure when requested by an operator; configured to passively track positions and orientations of the mobile device during the procedure; configured to passively capture video snippets and/or still images during steps or the procedure; configured to extract data from these video snippets and/or still images; configured to extract manually-recorded data from a scan of the paper copy of the procedure; and configured to compile location data, passively captured data, and data extracted from a scan of the paper copy of the procedure into a procedure file for an instance of the augmented paper procedure.

Therefore, the remote computer system can execute Blocks of the method S100 to merge data extracted from an unenhanced procedure with a) spatial and temporal data collected during an operation at an equipment unit by a target operator according to steps outlined in the procedure and b) augmented reality content defined by the target operator and/or by an administrator to generate a set of augmented digital and paper procedures that support different levels of guidance and data capture and that are executable by augmented reality headsets and mobile devices worn or carried by other operators when performing instances of this procedure in the facility. The remote computer system can then implement methods and techniques described above to selectively distribute instances of these augmented digital and paper procedures to augmented reality headsets and mobile devices worn or carried throughout the facility, such as based on operator preferences, device locations, and procedure schedules for equipment units throughout the facility.

Therefore, the remote computer system can execute Blocks of this variation of the method S100 to streamline generation of multiple augmented digital and paper procedures based on an existing procedure and data collected during an exemplary instance of this procedure, such as rather than deploying a film crew to film an equipment unit and operator during this procedure and rather than employing a post-production team to transform these data into a new augmented digital procedure.

11.2 Digital Draft Procedure

Blocks S140, S142, S144, and S146 of the method S100 recite: accessing a document specifying a set of steps of a procedure for an equipment type in a facility; linking a first description of a first step in the procedure—extracted from the document—to a first capture field; assigning a first capture type to the first capture field; and generating a digital draft procedure comprising a set of descriptions of the set of steps extracted from the procedure and the first capture field specifying capture of data of the first capture type from the equipment type. Generally, in Blocks S140, S142, S144, and S146, the remote computer system can: ingest a digital scan or a paper copy of a procedure file or an unenhanced digital file of the procedure; extract textual descriptions (and related content) of individual steps in the procedure from this document; interpret or access links between these steps; link data capture protocols (e.g., "input fields") to select steps in the procedure; and then compile these steps, step links, and data capture protocols into a first draft of an augmented digital procedure executable by an augmented reality headset or mobile device worn or carried by an operator to serve basic guidance—such as in the form of pop-up text descriptions of individual steps in the procedure—to the operator during an exemplary instance of this procedure, as shown in FIGS. 2 and 3.

In one implementation, an administrator affiliated with the facility loads an existing paper copy of a document outlining steps of a procedure for an equipment unit in the facility into an administrator portal—hosted by the remote computer system, as described above—to create a digital form of this procedure. For example, the administrator can scan the paper copy of the document with a smartphone, tablet, or dedicated scanner; alternatively, the administrator can directly access a digital (e.g., vectorized, digitized) copy of this document.

The administrator portal can then interface with the administrator to: highlight a procedure identifier in a digital copy of the document, such as a QR code, barcode, alphanumeric procedure identifier and revision number, or textual description of the procedure; and link this procedure identifier to a particular machine, type or class of machine, or configuration of machine in the facility and/or to a particular location, room, or area inside the facility. For example, the administrator can select each machine, machine type or class, or machine configuration from a dropdown menu—rendered in the administrator portal—of all machines in the facility and/or select a machine or location within the facility from a map (e.g., a plan map, or a 3D localization map) of the facility—rendered in the administrator portal—to link to this procedure identifier. The administrator portal can similarly interface with the administrator to link support equipment, such as a scale, to this procedure identifier.

Furthermore, in this implementation, the administrator portal (or the remote computer system) can implement text detection, recognition, and/or extraction techniques to automatically detect—in the digital copy of the document—text blocks (or "text descriptions") corresponding to individual steps in the procedure and to link these text blocks to individual steps in the procedure. The administrator portal (or the remote computer system) can also automatically interpret step numbers or step identifiers (e.g., 1, 2A-2C, 3.1-3.7, 4(A)-4(C), 5.1.a-5.4.c) for each of these steps and link or order these individual steps and their corresponding text blocks accordingly. Additionally or alternatively, the administrator portal can interface with the administrator to isolate these text blocks, link these text blocks to individual steps, and order or link these steps and text blocks accordingly. For example, the administrator portal can interface with the administrator to define individual steps or groups of steps as: prescribed (or "mandatory"); optional; or conditional (e.g., available or prescribed responsive to particular events or actions). The administrator portal (or the remote computer system) can then generate a step tree for steps in the procedure based on these step definitions.

The administrator portal can also interface with the administrator to specify data input regions (or "capture fields," "input fields") in this digital copy of the document. For example, the administrator can highlight input fields specifying manual recordkeeping in the digital copy, such as by highlighting a line or drawing a bounding box around a region in the digital copy of the document that specified recordation of a weight, pressure, temperature, density, or composition value read from a scale or dial on a machine or specifying recordation of a textual note. The administrator can then link each highlighted input field in the digital copy to a data type or data class, such as: a numerical input value; a text or alphanumeric input value; an image; an audio recording; or a video recording.

The remote computer system can then implement methods and techniques described above to compile these data—including a text block for each step, input fields definitions for select steps, and an order or tree for these steps—into a digital draft procedure. The administrator portal can then prompt the administrator to identify a target operator or a particular mobile device—assigned to a target operator—to execute an exemplary instance of the procedure according to the digital draft procedure.

11.3 Exemplary Instance of the Digital Draft Procedure

Block S148 of the method S100 recites, at a first time, serving the digital draft procedure to a first mobile device, assigned to a first operator, for completion at an equipment unit of the equipment type in the facility. Generally, in Block S148, the remote computer system can serve a first instance of the digital draft procedure to the target operator's augmented reality headset or mobile device for completion of an exemplary instance of this procedure at a particular equipment unit associated with this procedure or at an equipment unit of a particular equipment type associated with this procedure, as shown in FIGS. 2 and 3.

Upon receipt of this first instance of the digital draft procedure at her mobile device, the target operator may navigate to the corresponding equipment unit and manually confirm the start of this first instance of the digital draft procedure at her mobile device. Once confirmed by the target operator, the mobile device can: implement methods and techniques described above to detect and track its absolute location in the facility and/or its location and orientation relative to the equipment unit and record a timeseries of its detected locations and orientations and initiate. The mobile device can also: initiate passive capture of an audio feed and video a feed via sensors integrated into or coupled to the mobile device; present a text block for a first step in the procedure, such as in an augmented reality environment rendered on a heads-up display or over the video feed rendered on a handheld display of the mobile device; and record a start time of this first step.

If the first step is associated with an input field (or a "capture field"), the mobile device can also: prompt the operator to enter a value in a format corresponding to a type of the input field; record a value manually entered by the operator; flag a static image, a video snippet, and/or an audio clip recorded during this step or captured specifically around a time the target operator manually entered this value; and store this value, static image, video snippet, and/or audio clip as an example of data capture for this first step of the procedure. Additionally or alternatively, if the first step is associated with an input field (or a "capture field"), the mobile device can also: enable the target operator to activate locate a virtual pointer (e.g., an arrow, a caption box, a bounding box) within a virtual environment rendered on the mobile device (e.g., on the heads-up display or on a handheld display); prompt the operator to locate or align the virtual pointer with a readout or other display on the equipment unit; and register (i.e., locate) of this virtual pointer—for the first step of the procedure accordingly—to this readout or display on the equipment unit specifically. For example, the mobile device can interface with the target operator to locate a virtual three-dimensional arrow pointing toward a readout on the equipment unit and link this virtual pointer to the first text block containing a description of the first step in this procedure, such as by: rendering the video feed on the mobile device's display in real time; rendering the virtual three-dimensional arrow over the live video feed; and recording a persistent location of the virtual pointer relative to a reference feature on the equipment unit in response to selection of the reference feature by the first operator in the live video feed at the mobile device. Alternatively, the mobile device can register the virtual pointer to an absolute position in the facility or relative to the equipment unit more generally, such as by locating the virtual pointer in a localization map for the facility.

Similarly, if the first step of the procedure is associated with an input control specifying input by the target operator into the equipment unit (or other machine nearby), the mobile device can: flag a static image, a video snippet, and/or an audio clip recorded during this step or captured specifically around a time the target operator confirmed completion of this first step; and store this static image, video snippet, and/or audio clip as an example of input control for this first step of the procedure. The mobile device can also interface with the target operator, such as described above, to locate a virtual pointer to an input control interface—corresponding to the input control specified in the first step—on the equipment unit (or nearby machine) and to record a link between this virtual pointer, its location relative to the equipment unit or facility more generally, and this first step.

The mobile device can additionally or alternatively prompt the target operator to narrate her actions during the first step and can record an audio track and/or a video snippet of the target operator narrating this step. The mobile device (or the remote computer system) can also convert the target operator's speech to text and store this audio narration, video narration, and/or narration text with in association with the first step.

The target operator may then manually confirm completion of this first step at the mobile device. Accordingly, the mobile device can record a timestamp of this action, such as relative to the start time of this instance of the digital draft procedure, and then transition to a next step in the procedure. The mobile device can then repeat the foregoing methods and techniques to passively and actively record an audio feed, a video feed, a timeseries of its locations, geotagged virtual pointers, narration data, and/or data for capture fields for each subsequent step in the procedure.

The mobile device can then aggregate these data into a procedure file for this first instance of the digital draft procedure.

(In one variation, the target operator wears an augmented reality headset and carries a mobile device, both of which execute concurrent instances of the digital draft procedure as described above to capture audio feeds, video feeds, time-series of locations, geotagged virtual pointers, narration data, and/or capture field data for each step in the procedure from different perspectives of these devices. These devices can then separately aggregate these data into two procedure files for these concurrent instances of the digital draft procedure. The remote computer system can then implement methods and techniques described below to transform these data collected by the augmented reality headset into a first augmented digital procedure for execution on augmented reality headsets and to transform these data collected by the mobile device into a second augmented digital procedure for execution on handheld mobile devices.)

11.5 Post-Hoc Augmentation

The remote computer system can additionally or alternatively interface with the administrator via the administrator portal to locate augmented content—for capture fields and/or input controls—in steps in the procedure, as shown in FIGS. 2 and 3. In one implementation, the target operator performs a step of the digital draft procedure linked to a capture field, the remote computer system: streams a live 2D or 3D video feed—captured by the mobile device carried by the target operator during this instance of the digital draft procedure—to the administrator portal; activates a virtual pointer over the live video feed; prompts the operator to review and verify an action within the step; and prompts the administrator—responsive to verification of this action—to locate the virtual pointer relative to a readout, display, or other object or surface depicted in the live video feed. The remote computer system then registers the location of the virtual pointer—set by the administrator—relative a feature on the equipment unit more specifically and links these virtual pointer definitions with this step. Thus, when a second mobile device executes this step in a later instance of an augmented digital procedure generated by the remote computer system based on these data, the second mobile device can: detect this feature in a live video feed; calculate a location of the virtual pointer relative to this feature in the live video feed; and render the virtual pointer at this location in a virtual environment in order to guide completion of this step by a second operator.

Alternatively, the administrator portal can: translate and rotate the virtual pointer over the video feed based on administrator inputs; calculate a 3D location of the virtual pointer within a localization map of the facility based on a location of the virtual pointer over the video feed and a concurrent sequence of depth images recorded by the target operator's mobile device during this first instance of the digital draft procedure. Thus, when a second mobile device executes this step in a later instance of an augmented digital procedure generated by the remote computer system based on these data, the second mobile device can: activate the virtual pointer for this step in the localization map of the facility; calculate a location and orientation (or "pose") of the second mobile device within the localization map based on features detected in a live video feed recorded by the second mobile device; calculate a location of the virtual pointer in a heads-up display or handheld display of the second mobile device based on the pose of the second mobile device and the location of the virtual pointer in the localization map; and render the virtual pointer in this location in real-time.

Alternatively, the remote computer system can serve a 2D or 3D video snippet of a step of this procedure to the administrator portal following conclusion of this instance of the digital draft procedure, and the administrator portal can similarly interface with the administrator to verify proper completion of this step of the procedure and to define and geolocate a virtual pointer for a capture field in this step accordingly. More specifically, the administrator portal can: replay a video feed—recorded at the mobile device during a particular step of the first instance of the digital draft procedure—following completion thereof by the first operator; and locate a virtual pointer relative to a reference feature depicted in the video feed based on selection of this reference feature by the administrator within this video feed.

The remote computer system can implement similar methods and techniques to define and register a virtual pointer to an input control on the equipment unit for a step of the procedure specifying an interaction with this input control.

The remote computer system can also define a secondary virtual pointer activated by an anomalous event during the procedure and to register the secondary virtual pointer to an input control or display on the equipment unit. Thus, during an instance of the resulting augmented digital procedure, the remote computer system or the mobile device executing the augmented digital procedure can detect a deviation from a normal progression through the procedure and/or an out-of-specification event within the procedure based on data collected by the mobile device during this step of the augmented digital procedure. Accordingly, the mobile device can activate the secondary virtual pointer or other virtual guidance to indicate this deviation or out-of-specification event to the operator, such as to explain or guide the operator in identifying and responding to this deviation or anomalous event.

The remote computer system can also interface with the administrator (and/or with the target operator) to define and register virtual safety barriers and prompts (e.g., a "DO NOT CROSS" prompt a virtual boundary), virtual inspection indicators (e.g., a virtual boundary and prompt to inspect surface or region of an equipment unit), and/or virtual safety interrupts (e.g., a virtual arrow directed toward a "STOP" control and prompt to select this control before proceeding), etc. relative to features on the equipment unit depicted in this video feed of the fi instance of the digital draft procedure and to activate these virtual pointers within select steps of the procedure.

Therefore, the remote computer system can interface with the target operator in real-time during the first instance of the digital draft procedure and/or with the administrator during or after this first instance of the digital draft procedure: to generate an augmented guidance for a step in the procedure based on visual content recorded by the first mobile device during completion of this step in the digital draft procedure in Block S150; and to link this augmented guidance to a location proximal the equipment unit based on a pose of the target operator's mobile device during completion of this step in the first instance of the digital draft procedure in Block S152.

11.5 Automatic Data Capture

The remote computer system can also define automatic data capture parameters for a step in the procedure.

Figure 6:
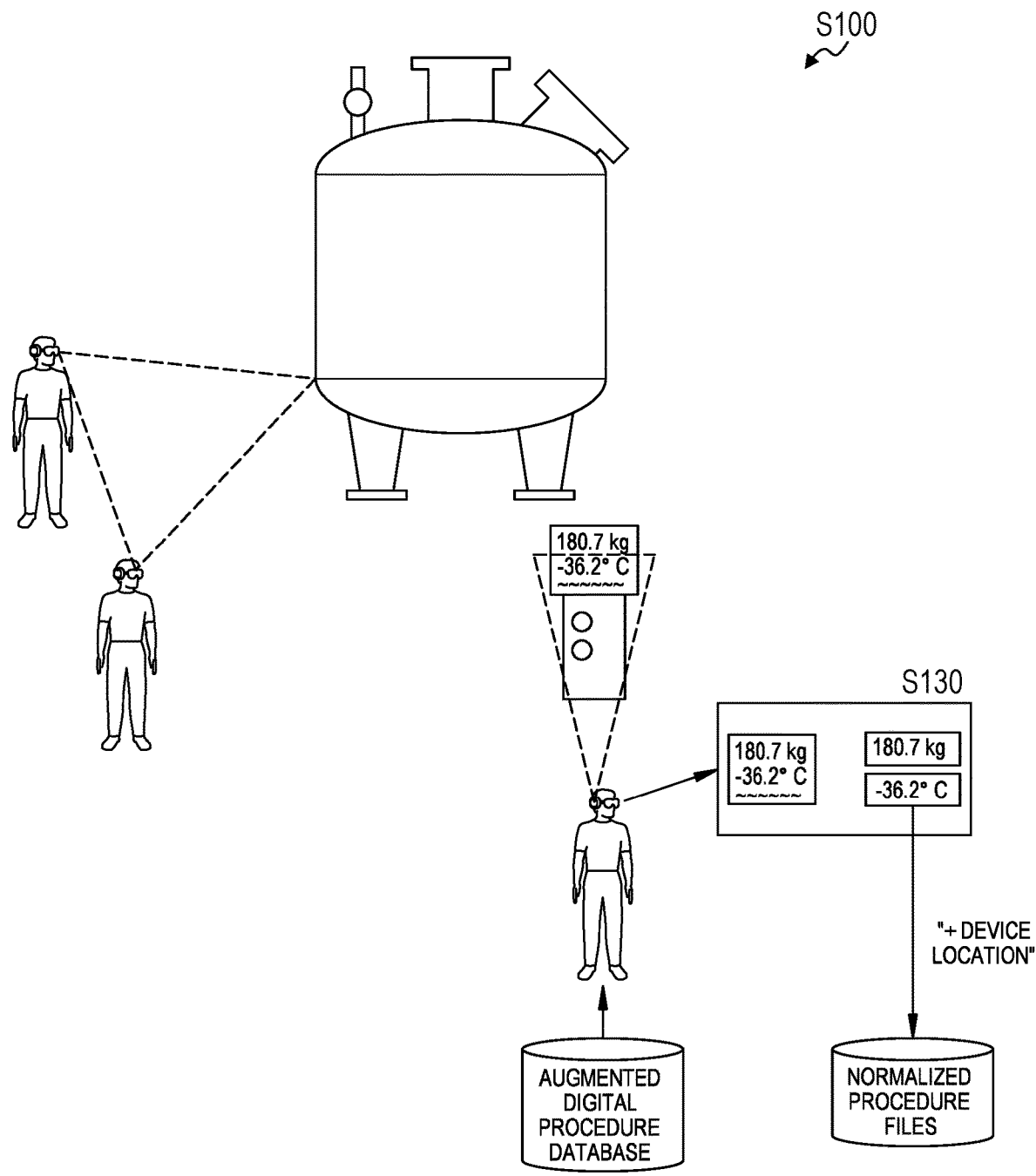
FIG. 6 is a schematic representation of one variation of the method.

In one implementation, the target operator's mobile device records: a timeseries of poses it occupies during the first instance of the digital draft procedure; and timestamps of a still image manually triggered at the mobile device by the target operator during a step first of the procedure. The remote computer system can then: isolate a pose of the mobile device—in the localization map of the facility or relative to the equipment unit more specifically—during this still image capture; define an automatic capture trigger for recording a still image when a mobile device occupies a position and orientation near this pose during execution of an instance of an augmented digital procedure thus generated by the remote computer system; and link this automatic trigger to the input field associated with this step of the procedure, as shown in FIG. 6.

The remote computer system can implement similar methods and techniques to define automatic capture triggers for video clip and audio clip capture—such as including start poses, stop poses, and/or clip durations—based on data captured by the target operator's mobile device during the first instance of the digital draft procedure.

11.6 Additional Guidance

The remote computer system can interface with the administrator via the administrator portal to link additional augmentation to steps in the procedure.

In one implementation, the administrator portal: presents visual representations of a video clip recorded during a step in the first instance of the digital draft procedure; enables the administrator to trim the video clip; prompts the operator to tag review of the video as either optional or mandatory; and records a link between the trimmed video clip and the step in the procedure accordingly. Thus, when a second mobile device executes this step in a later instance of an augmented digital procedure generated by the remote computer system based on these data, the second mobile device can: enable a second operator to access this video clip during this step in order to gain further insight into completion of this step if this video clip is labeled as "optional" by the administrator; or require the second operator to view this video clip before enabling a next step in the procedure if this video clip is labeled as "mandatory" by the administrator.

The remote computer system can similarly interface with the administrator to link other content to this step in the procedure, such as: an audio clip recorded during the first instance of the digital draft procedure; a text note entered by the target operator during this first instance of the digital draft procedure; an image recorded automatically or by the target operator during this instance of the digital draft procedure; and/or a graphic extracted from the original paper procedure. A second mobile device executing a later instance of an augmented digital procedure generated by the remote computer system based on these data can then selectively replay or render these content when this step in the procedure is active.

Furthermore, the remote computer system can repeat the foregoing process to augment other steps in the procedure. However, the remote computer system can interface with the target operator (e.g., in real-time) or with the administrator (e.g., in real-time or post hoc) in any other way to spatially locate augmented visual guidance within the facility and to temporally link augmented visual (and audible) guidance to discrete steps within this procedure. The remote computer system can then distribute and selectively downsample this augmented content into augmented digital procedure variants configured to execute on different devices and/or configured to serve such guidance to operators through different pathways. For example, the remote computer system can compile the augmented data with steps of the procedure to generate augmented digital procedures configured to execute on: an augmented reality headset; within an augment reality portal on a tablet computer or smartphone; on a mobile device (e.g., a smartphone) to actively capture when triggered manually and to serve optional guidance to operators in conjunction with paper copies of the procedure; and on a mobile device (e.g., a smartphone) to passively capture location, video, and/or audio data capture during completion of paper copies of the procedure.

11.6 Augmented Digital Procedure Generation for Augmented Reality Device

Block S154 of the method S100 recites generating an augmented digital procedure comprising the set of descriptions of the set of steps, comprising the first augmented guidance linked to the first location, and specifying capture of data of the first capture type from the equipment type and linked to the first capture field. In particular, in Block S154, the remote computer system can compile descriptions of steps in the procedure, step links, virtual content, additional augmentation content, and/or automatic capture triggers into an augmented digital procedure configured for execution by an augmented reality headset.

For example, the remote computer system can aggregate: a text block containing a description of a first step in the procedure; a virtual pointer type, registration data, and activation/deactivation triggers; links to exemplary video, images, graphics, or audio from the first step of the first instance of the digital draft procedure and/or original paper procedure with optional or mandatory review triggers; and an automatic capture trigger, including pose, timing, a capture type definitions for the first step. The remote computer system can also interface with the administrator via the administrator portal to define positions of these data within a virtual environment. The remote computer system can then compile these data into a first augmented step of the procedure. The computer system can also define: links to input fields in the first step for manually-controlled and automatically-captured data; formatting parameters for storing these manually-controlled and automatically-captured data in a procedure file for an instance of the augmented digital procedure; and definitions for storing device location and orientation data, step start and stop times, etc. in this procedure file.

When an augmented reality headset later executes this first augmented step in an augmented digital procedure thus generated by the remote computer system, the augmented reality headset can thus: selectively render these visual content in a virtual environment; selectively capture a still image, video, or audio clip according to these content and definitions stored in this first augmented step; and write manually-captured data, automatically-captured data, device location, and step timing data, etc.—in a normalized, defined format—to a procedure file for this instance of the procedure.

The remote computer system can repeat this process for each other step of the procedure to generate a set of augmented steps and link these steps according to the step tree described above to generate this first version of the augmented digital procedure configured for execution on an augmented reality headset. The remote computer system can then link this augmented digital procedure to a particular equipment unit or equipment type and publish this augmented digital procedure to a procedure database for access by other operators in the facility. (Alternatively, the remote computer system can return this augmented digital procedure to the target operator's mobile device for completion of a second instance of this augmented digital procedure in order to verify augmentation of the augmented digital procedure before enabling access to the augmented digital procedure by other operators in the facility.)

Later, the remote computer system can serve a second instance of this augmented digital procedure to a second augmented reality headset (or other augmented reality device) worn by a second operator. While a first step associated with a virtual pointer in this second instance of the augmented digital procedure is active, the augmented reality headset can: scan a video feed—recorded by the second augmented reality headset via an integrated or connected camera—for a reference feature linked to this virtual pointer; and render the virtual pointer—aligned to the reference feature—on a display of the second augmented reality headset. Alternatively, the second augmented reality headset can: track its location and orientation in the facility or relative to the equipment unit; calculate a position of the virtual pointer in a viewfinder at the second augmented reality headset based on the location and orientation of the second augmented reality headset; and render the virtual pointer on its heads-up display accordingly.

Similarly, while a second step associated with an automatic capture trigger in this second instance of the augmented digital procedure is active, the augmented reality headset can: track its location and orientation in the facility or relative to the equipment unit; selectively capture a still image, video clip, or audio clip based on parameters defined in this automatic capture trigger; and automatically store these data in association with an input field defined in this step of the procedure.

Furthermore, while a third step associated containing optional augmented content in this second instance of the augmented digital procedure is active, the augmented reality headset can: render an icon indicating availability of this optional augmented content (e.g., an example video from the first instance of the digital draft procedure) on its display (e.g., in the viewfinder of the augmented reality headset); and retrieve and render or replay this optional augmented content when the icon is selected by the operator or responsive another input from the operator. In this example, the augmented reality headset can selectively enable replay of this optional augmented content when the augmented reality headset falls within a threshold distance of the target operator's location during recordation of this optional augmented content or if the augmented reality headset is location within a range of distances associated with this optional augmented content by the target operator or by the administrator.

During this second instance of the augmented digital procedure, the augmented reality headset can also implement methods and techniques described above to track its location in the facility, capture passive audio and/or visual data, serve augmented guidance to the operator, capture audio and/or visual data triggered by the operator, and then populate a procedure file for this instance of the augmented digital procedure with these data.

11.7 Augmented Digital Procedure Generation for Handheld Device

The remote computer system can implement similar methods and techniques to compile descriptions of steps in the procedure, step links, virtual content, additional augmentation content, and/or automatic capture triggers into an augmented digital procedure configured for execution by a handheld mobile device. In one implementation, the remote computer system compiles these data into a second version of the augmented digital procedure as described above but with a specification or callout to overlay virtual content—including virtual pointers—over a live video feed rendered on a display of the handheld mobile device. The remote computer system can then link this augmented digital procedure to a particular equipment unit or equipment type and publish this augmented digital procedure to the procedure database for access by other operators in the facility.

Later, the remote computer system can serve a third instance of this augmented digital procedure to a third mobile device carried by a third operator. While a first step associated with a virtual pointer in this third instance of the augmented digital procedure is active, the mobile device can: record a live video feed via an integrated or connected camera; scan this video feed for a reference feature linked to this virtual pointer; overlay the video feed with the virtual pointer aligned to this reference feature when the mobile device occupies a location and pose linked to this virtual pointer in this step of augmented digital procedure; and render this augmented video feed on its integrated display. Alternatively, the mobile device can: track its location and orientation in the facility or relative to the equipment unit; calculate a position of the virtual pointer in a viewfinder at the mobile device based on the location and orientation of the mobile device; and render the virtual pointer over the live video feed on its display. The computer system can also write manually-captured data, automatically-captured data, device location, and step timing data, etc.—in a normalized, defined format—from this instance of the augmented digital procedure to a procedure file for this instance of the procedure.

However, the remote computer system can compile these data into an augmented digital procedure configured for execution on a handheld mobile device in any other way.

11.8 Augmented Paper Procedure Generation

The remote computer system can implement similar methods and techniques to compile timeseries of device locations, step start and stop times, step-specific device locations and orientations, additional augmentation content, and/or automatic capture triggers into an augmented paper procedure configured for execution by a mobile device worn or carried by an operator while working through a paper copy of the procedure. In this implementation, the remote computer system can compile these data into an augmented paper procedure that contain: spatial and/or temporal triggers for automatically capturing audio clips, video clips, and/or static images during specific steps of the procedure; parameters for extracting values (e.g., numerical values) from these automatically-captured raw data; links between these automatically-captured raw data or extracted values and input fields in steps in the procedure; and/or links to additional augmented content and menus for navigating to this content at the mobile device; etc. The remote computer system can also implement methods and techniques described above to write definitions for extracting values from a scan or image of the paper copy of the procedure and linking these data to input fields in specific steps in the procedure. The remote computer system can then link this augmented paper procedure to a particular equipment unit or equipment type and publish this augmented paper procedure to the procedure database for access by other operators in the facility.

Later, the remote computer system can serve a fourth instance of this augmented paper procedure to a four mobile device carried by a fourth operator, such as when the four operator scan a paper copy of the procedure at this mobile device and/or occupies a location in the facility adjacent the corresponding equipment unit for more than a threshold period of time, such as described above. During execution of this fourth instance of the augmented paper procedure, the mobile device can: passively capture data according to automatic capture trigger defined in the augmented paper procedure; link these data to input fields in the steps in the procedure; replay additional augmented content for the fourth operator if selected by the fourth operator; and store these data in a procedure file for the fourth instance of the augmented paper procedure. Upon completion of a page in the paper copy of the procedure or upon completion of the procedure, the fourth operator may manually scan the page(s) with the mobile device, and the mobile device can extract values from this scan(s) and write these values—in addition to automatically-captured data, device location, and step timing data—to the procedure file for this instance of the procedure according to the augmented paper procedure, such as described above.

However, the remote computer system can compile these data into an augmented paper procedure configured for execution on a mobile device in any other way.

11.9 Data Normalization and Procedure File

As described above, the mobile device (e.g., the handheld mobile device, the augmented reality headset) or the remote computer system can write both data recorded actively by the operator and data recorded passively (e.g., "in the background") by the mobile device to a unique procedure file for this unique instance of the augmented digital procedure, as shown in FIG. 1.

For example, the remote computer system can geotag and timestamp these active and passive data in the procedure file and can write an identifier of the particular machine (e.g., a machine make, model, and serial number), an identifier of the operator (e.g., an employee ID number), and an augmented digital procedure identifier (e.g., procedure ID and revision number) to this procedure file. The remote computer system can also populate input fields defined for the procedure in the procedure file with data captured passively or actively by a mobile device during or after an instance of the augmented digital or paper procedure such that each procedure file for this procedure contains essential data for the procedure in a consistent format. The remote computer system can store each procedure file in a remote database for real-time or post-hoc access, such as by the administrator or supervisor.

In particular, regardless of the format the procedure elected by an operator—such as an augmented paper procedure, a digital procedure on a handheld device, or a digital procedure on an augmented reality headset—the remote computer system can leverage input field definitions stored in these augmented digital and paper procedures for the procedure to: access a physical or digital record of device locations, machine inputs, and captured data during an instance of this procedure; and record these data to one procedure file in one normalized format.

11.10 Procedure Review

Furthermore, the remote computer system (or the mobile device) can detect changes or deviations from a normal progression through the procedure and/or out-of-specification events within the procedure based on data collected by the mobile device during the augmented digital procedure. The remote computer system (or the mobile device) can also store images, audio clips, and/or video clips captured by the mobile device during these changes, deviations, or out-of-specification events. The remote computer system (or the mobile device) can also annotate these images or video clips with localization pointers that indicate locations of these changes, deviations, or out-of-specification events in order to assist later investigation of this deviant augmented digital procedure. The remote computer system can also detect changes, deviations, or out-of-specification events in (near) real-time during the augmented digital procedure and can interface with mobile device to prompt the operator to provide additional context for these events, such as in the form of textual descriptions, voice capture, or narrated video.)

Responsive to detecting such a deviation or out-of-specification event during an instance of the augmented digital procedure, the remote computer system can flag the procedure file for this instance of the augmented digital procedure for review, such as by the administrator, supervisor, or other operator. The remote computer system can then serve this procedure file—or select, flagged images, audio clips, and/or video clips during deviations or out-of-specification events in this augmented digital procedure—to the administrator, etc. for review.

Furthermore, by storing visual and non-visual data collected during this instance of the augmented digital procedure (or augmented paper procedure) in a normalized format in a procedure file, the remote computer system can: apply a stored model or calculation to the procedure file to extract a particular metric or analytic from this instance; and enable a review to search for particular terms, input field values, operator locations, etc. within the procedure file and across procedure files for multiple instances of the augmented digital procedure (and/or augmented paper procedure).

11.11 Step Revision

Furthermore, in this variation, if a new step is added to the procedure or if a step in the procedure is modified, the remote computer system can: interface with administrator via the administrator portal to access a (new) description of this (new) step; revise the digital draft procedure to reflect this new or modified step; and schedule a target operator to perform an exemplary instance of this revised digital draft procedure. The remote computer system can then implement methods and techniques described above: to access data recorded by the target operator's device during completion of this new or revised step in this second instance of the digital draft procedure; and to compile these data into revised versions of the augmented digital and paper procedures for execution on augmented reality headsets and/or mobile devices carried or worn by operators in the facility.

For example, in response to a revision of a first step in the procedure, the remote computer system can: access a first revised description of the first step; generate a second digital draft procedure containing the first revised description of the first step; serve the second digital draft procedure to a mobile device—assigned to a target operator—for completion at the corresponding equipment unit; generate revised augmented guidance for the first step in the procedure based on content recorded by this mobile device during completion of the first step in the revised digital draft procedure; and then incorporate the revised augmented guidance—in replacement of augmented guidance previously associated with the first step in this procedure—into the augmented digital procedure for this procedure.

11.12 New Procedure Pathway

Similarly, for a procedure that includes a conditional step as described above, the first instance of first the digital draft procedure completed by the target operator may omit a conditional step (or a sequence of conditional steps) in the procedure. Therefore, the augmented digital and paper procedures generated by the remote computer system based on data collected during this first instance of the digital draft procedure may exclude parameters for triggering automatic data capture, virtual pointers, and additional augmented guidance (e.g., an exemplary video) of this conditional step.

Therefore, in this variation, the remote computer system can write flags—to the augmented digital and paper procedures—for storing location data, data capture characteristics, video feeds, and audio feeds, etc. during conditional steps of the procedure for which exemplary data is not yet available. Later, when an operator enters a conditional step in this augmented digital or paper procedure, the operator's mobile device can record these location data, data capture characteristics, video feeds, and audio feeds, etc. during this conditional step; and the remote computer system can prompt the administrator to review these data at the administrator portal and verify completion of this conditional step. The remote computer system can then interface with the administrator as described above to compile these data into an augmented conditional step for the procedure and can incorporate this augmented conditional step into the augmented digital and paper procedures for execution on augmented reality headsets and/or handheld mobile devices.

For example, the remote computer system can generate an augmented digital procedure containing augmented guidance for a first subset of steps in a procedure based on visual content recorded by the target operator's mobile device during completion of this first subset of steps in a first instance of the corresponding digital draft procedure. The remote computer system can later: serve a second instance of the resulting augmented digital procedure to an augmented reality headset worn by a second operator in the facility; and generate a second augmented guidance for a second step in the procedure—not in the first subset of steps completed by the target operator during the instance of the digital draft procedure—based on visual content recorded by the augmented reality headset during completion of a second subset of steps in this second instance of the augmented digital procedure. The computer system can then: link the second augmented guidance to a second location proximal the equipment unit based on a second pose of the second augmented reality headset during completion of the second step in the second instance of the augmented digital procedure; incorporate this second augmented guidance—linked to the second location—into the augmented digital procedure for this procedure; and later serve instances of this updated augmented digital procedure to other augmented reality devices assigned to other operators in the facility.

The remote computer systems and methods described herein can be embodied and/or implemented at least in part as a machine configured to receive computer-readable medium storing computer-readable instructions. The instructions can be executed by computer-executable components integrated with the application, applet, host, server, network, website, communication service, communication interface, hardware/firmware/software elements of an operator computer or mobile device, wristband, smartphone, or any suitable combination thereof. Other systems and methods of the embodiment can be embodied and/or implemented at least in part as a machine configured to receive computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for augmenting procedures at production equipment includes:
    accessing a first step for an equipment type, the first step comprising a first description linked to a first capture field specifying capture data of a first capture type from the equipment type;
    at a first time, serving the first step to a first operator, for execution at an equipment unit of the equipment type;
    generating a first augmented guidance for the first step based on visual content recorded by a first device at the equipment unit during execution of the first step;
    linking the first augmented guidance to a first location proximal the equipment unit based on a first pose of the first mobile device during execution of the first step;
    generating an augmented digital procedure:
        comprising the first step;
        comprising the first augmented guidance linked to the first location; and
        specifying capture of data of the first capture type from the equipment type and linked to the first capture field; and
    following the first time, serving the augmented digital procedure to a second operator.

2. The method of claim 1:
    wherein linking the first augmented guidance to the first location proximal the equipment unit comprises linking the first augmented guidance to a display on the equipment unit;

wherein serving the augmented digital procedure to a second operator comprises, at a second time succeeding the first time, serving a second instance of the augmented digital procedure to a second augmented reality device worn by a second operator in the second set of operators; and further comprising:

at the second augmented reality device, rendering the first augmented guidance, aligned to the display on the equipment unit, based on a pose of the second augmented reality device during execution of the first step in the second instance of the augmented digital procedure;

at the second augmented reality device, capturing a second image of the display;

extracting a value, of the first capture type, on the display from the second image; and storing the value, linked to the first capture field, in a second procedure file for the second instance of the augmented digital procedure.

3. The method of claim 2:

further comprising, at a third time succeeding the second time, serving a third instance of the augmented digital procedure to a third augmented reality device carried by a third operator in the second set of operators; and further comprising:

at the third augmented reality device, rendering the first augmented guidance, aligned to the display on the equipment unit, based on a pose of the third augmented reality device during execution of the first step in the third instance of the augmented digital procedure;

at the third augmented reality device, capturing a third image of the display;

extracting a second value, of the first capture type, on the display from the third image; and storing the second value in a second procedure file for the third instance of the augmented digital procedure.

4. The method of claim 1, further comprising:

generating a first passive capture definition for the first step of a procedure linked to the first capture field based on the first pose of the first device during execution of the first step and a start time of the first step;

generating an augmented paper procedure linked to a document specifying the first step of the procedure, the augmented paper procedure specifying passive capture of data based on the first passive capture definition; and following the first time, at a third device carried by a third operator:

detecting an identifier of the document in an image of a paper copy of the procedure carried by the third operator;

in response to detecting the identifier of the document, loading an instance of the augmented paper procedure;

passively capturing a first image according to the first passive capture definition; and linking the first image to the instance of the augmented paper procedure.

5. The method of claim 4, further comprising:

accessing a second image of the paper copy of the procedure captured by the third device during the instance of the augmented paper procedure;

extracting a value, handwritten on the paper copy of the procedure, from the second image;

storing the value, linked to the first capture field, and the first image in a third procedure file for the instance of the augmented paper procedure; and serving the value and the first image to a supervisor for verification of the first step in the instance of the augmented paper procedure.

6. The method of claim 1:

wherein serving the first step to the first operator for execution at the equipment unit of the equipment type in the facility comprises serving the first step to the first device assigned to the first operator for execution of an exemplary instance of the first step of a procedure in the facility;

further comprising accessing a video feed captured by the first device and a timeseries of locations of the first device during execution of the exemplary instance of the procedure;

wherein generating the first augmented guidance comprises extracting a first example video, depicting the first step of the procedure, from the video feed;

wherein linking the first augmented guidance to the first location comprises associating the first augmented guidance with a first range of locations of the first device, represented in the timeseries of locations, concurrent with the first example video;

wherein serving the augmented digital procedure to the second operator comprises, at a second time succeeding the first time, serving a second instance of the augmented digital procedure to a second augmented reality device worn by the second operator in a second set of operators at a facility containing the equipment unit of the first equipment type; and further comprising, at the second augmented reality device, while the first step in the second instance of the augmented digital procedure is active, enabling replay of the first example video in response to the second augmented reality device falling within the first range of locations.

7. The method of claim 1:

further comprising accessing a first video feed captured by the first device during execution of the first step;

wherein generating the first augmented guidance for the first step of a procedure comprises:

recording a reference feature, on the equipment unit, depicted in the first video feed; and locating a virtual pointer relative to the reference feature, the virtual pointer directed to a readout on the equipment unit associated with the first capture field;

wherein serving the augmented digital procedure to the second operator comprises, at a second time succeeding the first time, serving a second instance of the augmented digital procedure to a second augmented reality device worn by the second operator in a second set of operators at a facility containing the equipment unit of the first equipment type; and further comprising, at the second augmented reality device, while the first step in the second instance of the augmented digital procedure is active:

scanning a second video feed, recorded by the second augmented reality device, for the reference feature; and rendering the virtual pointer, aligned to the reference feature, on a display of the second augmented reality device.

8. The method of claim 7:
wherein locating the virtual pointer relative to the reference feature comprises locating the virtual pointer comprising a virtual three-dimensional arrow pointing toward the readout;
further comprising linking the virtual pointer to the first description of the first step of the procedure; and
wherein rendering the virtual pointer, aligned to the reference feature, on the display of the second augmented reality device comprises rendering the first description of the first step and the virtual three-dimensional arrow pointing toward the readout in a field of view of the second augmented reality device.

9. The method of claim 7, wherein locating the virtual pointer relative to the reference feature comprises:
at an administrator portal, replaying the first video feed following execution of the first step by the first operator; and
locating the virtual pointer relative to the reference feature in response to selection of the reference features by an administrator at the administrator portal.

10. The method of claim 7, wherein locating the virtual pointer relative to the reference feature comprises, during execution of the first step by the first operator:
rendering the first video feed on the first device in real time;
rendering the virtual pointer over the first video feed; and
recording a persistent location of the virtual pointer relative to the reference feature in response to selection of the reference feature by the first operator in the first video feed at the first device.

11. The method of claim 7, further comprising:
at the second augmented reality device, while the first step in the second instance of the augmented digital procedure is active:
detecting the readout on the equipment unit in the video feed; and
extracting a value from the readout detected in the video feed; and
storing the value, in association with the first capture field, in a second procedure file for the second instance of the augmented digital procedure.

12. The method of claim 1:
wherein generating the augmented digital procedure comprises generating the augmented digital procedure comprising augmented guidance based on visual content recorded by the first device during execution of a first subset of steps in a set of steps, the first subset of steps comprising the first step;
wherein serving the augmented digital procedure to the second operator comprises, at a second time succeeding the first time, serving a second instance of the augmented digital procedure to a second augmented reality device worn by the second operator in a second set of operators at a facility; and
further comprising:
generating a second augmented guidance for a second step based on visual content recorded by the second augmented reality device during execution of a second subset of steps, in the set of steps, in the second instance of the augmented digital procedure, the second subset of steps comprising the second step, the second step absent from the first subset of steps;
linking the second augmented guidance to a second location proximal the equipment unit based on a second pose of the second augmented reality device during execution of the second step in the second instance of the augmented digital procedure;
incorporating the second augmented guidance linked to the second location into the augmented digital procedure; and
following the second time, serving instances of the augmented digital procedure to augmented reality devices assigned to a third set of operators.

13. The method of claim 1, further comprising, in response to a revision of the first step of the first step:
accessing a first revised description of the first step according to the revision;
generating a digital draft procedure comprising the first revised description of the first step;
at a second time succeeding the first time, serving the digital draft procedure to the first device, assigned to the first operator, for execution at the equipment unit;
generating a first revised augmented guidance for the first step based on visual content recorded by the first device during execution of the first step in the revised digital draft procedure; and
incorporating the first revised augmented guidance, in replacement of the first augmented guidance, into the augmented digital procedure.

14. The method of claim 1, further comprising:
accessing a document comprising a digital scan of a paper copy of the first step; and
linking the first description of the first step to the first capture field comprising:
detecting a set of text blocks in the digital scan;
recording placement of the first capture field, by an administrator at an administrator portal, on the digital scan; and
linking a first text block, in the set of text blocks, to the first capture field based on the proximity of the first capture field to the first text block.

15. The method of claim 14:
wherein generating the first augmented guidance for the first step of a procedure comprises generating the first augmented guidance specifying, during the first step in an instance of the augmented digital procedure:
display of the first text block in an augmented reality environment at an augmented reality device;
display of a virtual pointer, in the augmented reality environment, aligned with a region of the equipment unit corresponding to the first step at the augmented reality device;
automatic capture of a first value from the region of the equipment unit by the augmented reality device; and
recordation of the first value in association with the first capture field in a first procedure file;
further comprising generating an augmented paper procedure specifying:
detection of the first capture field in an image of a paper copy of the procedure;
extraction of a second value from the first capture field detected in the image of the paper copy of the procedure; and
recordation of the second value in association with the first capture field in a second procedure file; and
further comprising:
distributing instances of the augmented digital procedure to a second set of augmented reality devices responsive to selection of the augmented digital procedure by operators at the second set of augmented reality devices; and distributing instances of the augmented paper procedure to a third set of mobile devices responsive to selection of the augmented paper procedure by operators at the third set of mobile devices.

16. The method of claim 1:
further comprising, at a second augmented reality device, worn by the second operator in a second set of operators at a facility:
tracking a location of the second augmented reality device within the facility; and
in response to the location of the second augmented reality device falling within a threshold distance of the equipment unit, requesting the augmented digital procedure; and
wherein serving instances of the augmented digital procedure to augmented reality devices assigned to the second set of operators in the facility comprises, at a second time succeeding the first time, serving a second instance of the augmented digital procedure to the second augmented reality device.

17. A method for augmenting procedures at production equipment includes:
accessing a first set of images captured by a camera during execution of a first instance of a first step at a first equipment unit of a first equipment type by a first operator within a first period of time;
extracting a first set of values, as results of the first instance of the first step completed at the first equipment unit, from the first set of images;
rendering the first step at a second device associated with a second operator during execution of a second instance of an augmented digital version of the first step within a second period of time following the first period of time;
recording a second set of data manually entered into the second device by the second operator according to the first step as results of the second instance completed at the first equipment unit;
rendering the first step in a virtual environment on a display for a third device associated with a third operator during execution of a third instance of the augmented digital version of the first step within a third period of time following the second period of time; and
recording a third set of data at the third device according to the first step as results of the third instance completed at the first equipment unit.

18. The method of claim 17, further comprising:
transmitting the first set of values to a supervisor for verification of the first instance of the first step of a procedure following the first period of time;
transmitting the second set of values to the supervisor for verification of the second instance of the augmented digital version of the procedure following the second period of time; and
transmitting the third set of values to the supervisor for verification of the third instance of the augmented digital version of the procedure following the third period of time.

19. The method of claim 17:
wherein recording the third set of data at the third device according to the first step as the third operator completes the third instance of the augmented digital version of the first step of a procedure comprises:
detecting a readout on the equipment unit in a video frame recorded by a camera integrated into the augmented reality headset; and
extracting a value from the video frame; and
further comprising, writing the value to a third procedure file containing the third set of data.

20. The method of claim 17, further comprising, prior to the first time:
accessing a digital copy of a procedure comprising the first step;
linking a first description of the first step in a set of steps in the procedure, extracted from the digital copy of the procedure, to a first capture field;
assigning a first capture type to the first capture field;
generating a digital draft procedure comprising a set of descriptions of the set of steps extracted from the procedure and the first capture field specifying capture of data of the first capture type from the equipment type;
at a first time, serving the digital draft procedure to a first mobile device, assigned to a first operator, for execution at the equipment unit;
generating a first augmented guidance for the first step of the procedure based on visual content recorded by the first mobile device during execution of the first step in the digital draft procedure;
linking the first augmented guidance to a first location proximal the equipment unit based on a first pose of the first mobile device during execution of the first step in the digital draft procedure;
generating the augmented digital procedure comprising the set of descriptions of the set of steps, comprising the first augmented guidance linked to the first location, and specifying capture of data of the first capture type from the equipment type and linked to the first capture field;
serving the second instance of the augmented digital procedure to the handheld mobile device during the second period of time; and
serving the third instance of the augmented digital procedure to the augmented reality headset during the third period of time.

* * * * *